(12) United States Patent
Johnson et al.

(10) Patent No.: US 6,453,302 B1
(45) Date of Patent: *Sep. 17, 2002

(54) COMPUTER GENERATED PRESENTATION SYSTEM

(75) Inventors: Jerome D. Johnson, North Mankato; Dale A. Mehr, Mankato, both of MN (US)

(73) Assignee: Clear With Computers, Inc., Mankato, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/756,122

(22) Filed: Nov. 25, 1996

(51) Int. Cl.[7] .............................................. G06F 17/60
(52) U.S. Cl. ....................................................... 705/27
(58) Field of Search ............................... 705/27, 26, 1, 705/10, 14; 707/906–911, 10, 100–104

(56) References Cited

U.S. PATENT DOCUMENTS

| 4,982,346 A | * | 1/1991 | Girouard et al. ............. 364/550 |
| 5,272,623 A | * | 12/1993 | Grubb et al. ................... 705/1 |
| 5,615,342 A | * | 3/1997 | Johnson ........................ 705/27 |
| 5,754,938 A | * | 5/1998 | Herz et al. ..................... 455/2 |

FOREIGN PATENT DOCUMENTS

WO    WO 00/67092    * 11/2000

OTHER PUBLICATIONS

Egol, Len, "Let's get personal . . . Special Focus on Printing/Production . . . ", Direct, v3, n11, p42(4), Nov. 1991, (dialog file 148, Accession No. 05495197).*

* cited by examiner

*Primary Examiner*—Frantzy Poinvil
(74) *Attorney, Agent, or Firm*—Merchant & Gould P.C.

(57) ABSTRACT

A sales presentation generation system which integrates customer specific information with a selling entity element to generate a presentation item for the sale of a product customized for a particular customer of the selling entity. The customized presentation item may be constructed in a manner which reinforces the identity of the selling entity element by integrating customer solution information with a selling entity element having an impression characteristics which indirectly conveys the identity of the selling entity. A portion of the customer solution may be presented to the customer in a manner which maintains such impression characteristics of the selected selling entity element so as to convey a desired corporate "image". A presentation item generated using the system may be further, or in the alternative, customized in accordance with the type of customer to which the presentation is directed. Accordingly, the present system significantly enhances the impact of sales presentations and the likelihood of consummating a sale.

19 Claims, 62 Drawing Sheets

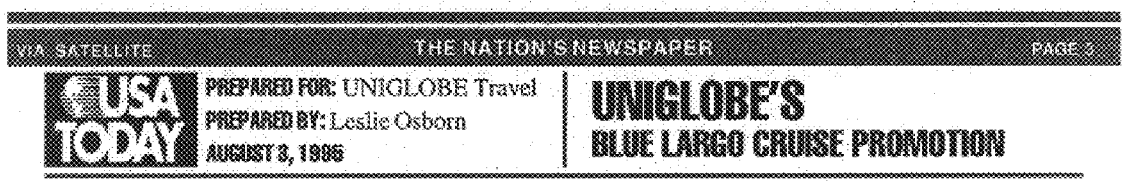

Objectives/Strategies/Tactics

Objectives
- Increase consumer bookings/reservations for UNIGLOBE Travel and its "Blue Largo Cruise" promotion
- Heighten awareness for UNIGLOBE Travel with those leisure travelers across the USA most likely to buy
- Generate broad awareness of the advantages of cruising as the preeminent vacation category
- Create excitement among travel agents for "Blue Largo Cruise" promotion

Strategy
- Conduct a continuous advertising campaign for UNIGLOBE Travel's "Blue Largo Cruise" promotion in a national publication that reaches responsive readers within a complementary editorial environment
- Implement a consumer promotion that increases travel agency traffic during "Blue Largo Cruise" promotion
- Develop multimedia advertising to inform travelers about the advantages of a cruise vacation
- Generate travel agent enthusiasm for "Blue Largo Cruise" promotion

Tactics
- Take advantage of USA TODAY's daily presence to build excitement, impact and awareness of "Blue Largo Cruise" promotion
- Advertise continually to target UNIGLOBE Travel's key prospects—leisure travelers—in USA TODAY'S Life section (16 full-page ads for 4 weeks, Monday - Thursday; below Today's TV Grid, Friday)
- Employ an advertising program in USA TODAY to highlight advantages of a cruise vacation and UNIGLOBE Travel services to the USA's most frequent travelers
- Implement travel trade advertising that broadens awareness of "Blue Largo Cruise" promotion among UNIGLOBE travel agents

Contents

LIFE SECTION--DESTINATION TRAVEL
 Destination Travel ................................................................................................ 4

CIRCULATION
 Total USA Coverage ............................................................................................ 5
 Continued Growth ............................................................................................... 6

KEY AUDIENCE INFORMATION
 Travel Advertising Pages ..................................................................................... 7
 Targeted Readership ............................................................................................ 8
 Readership on the Go .......................................................................................... 9
 Leading Travel Circulation ................................................................................ 10
 Unique Audience Penetration ............................................................................ 11

RECOMMENDED ADVERTISING PROGRAMS
 TV Grid .............................................................................................................. 12
 Interactive 800 Number & Direct Mail Program .............................................. 13

RATES
 Rates ................................................................................................................... 14

Recommended Advertising Programs

TV Grid

Where do more than 5.5 million affluent readers look first to find out what's on TV? USA TODAY's TV Grid. On the back page of USA TODAY's Life section, this prominent 4-color page features all the network line-ups, cable programming and our critic's choices for quality viewing. Anchoring the page is a stand-out positioning opportunity for advertisers looking to reach USA TODAY's audience of broadcast viewers.

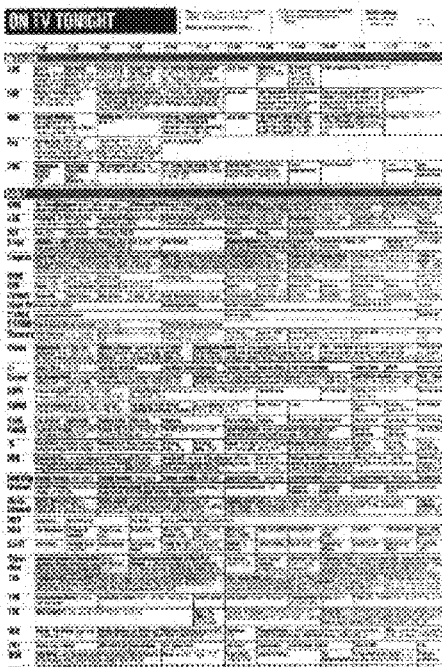

FLEXIBLE SCHEDULING AND DISCOUNTED FREQUENCY

A horizontal third-page position is available to advertisers on a one-time basis or as part of a continuity program. The following pricing plan applies to TV Grid advertising schedules.

Domestic Edition Pricing

|  | Mon-Th | Friday | Effective Discount |
|---|---|---|---|
| Base Rate | $49,300 | $56,400 | -- |
| 13x | 44,370 | 50,760 | 10% |
| 26x | 36,975 | 42,300 | 25% |
| 52x | 32,045 | 36,660 | 35% |

Worldwide Pricing

|  | Mon-Th | Friday | Effective Discount |
|---|---|---|---|
| Base Rate | $56,700 | $64,800 | -- |
| 13x | 51,030 | 58,320 | 10% |
| 26x | 42,525 | 48,600 | 25% |
| 52x | 36,855 | 42,120 | 35% |

OTHER DISCOUNTS MAY APPLY

▶ Advertisers who have regular-rate card volume contracts that provide higher discounts than those listed above will be allowed to apply those discounts to the base unit prices indicated on the pricing schedule.

▶ Advertising volume accrued under this program *will* count towards fulfillment of volume contracts and VIP agreements.

▶ VIP bonus space earned under this program *can* be ordered to run on the TV Grid page.

▶ Advertisers participating under special discount programs such as the Flat Rate Program or the Broadcast Buying Program *cannot* use the discounts achieved through those programs to purchase schedules on the TV Grid page.

For more information on USA TODAY's TV Grid, contact your USA TODAY sales representative.

Fig. 18N
Rates
| Description | Customer Value | Customer Cost | Savings |
|---|---|---|---|
| 52 National, Four Color, 4-Col. Third 8.63" x 10.5" | $2,516,000 | $2,114,112 | $401,888 |
| 16 National, Four Color, Full Page 13" x 21" | 1,481,200 | 1,273,832 | 207,368 |
| 4 USA TODAY's TV Grid 13" x 7" | 214,728 | 184,666 | 30,062 |
| 20,000 Distribution, Same Day | 11,000 | 0 | 11,000 |
| Interactive 800 Number | 35,000 | 0 | 35,000 |
| Totals | $4,257,928 | $3,572,610 | $685,318 |
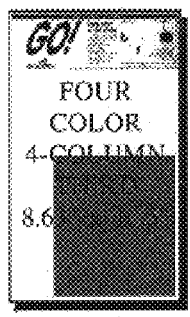 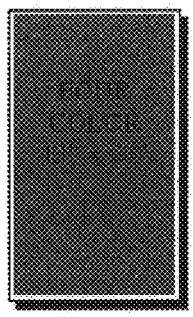 
 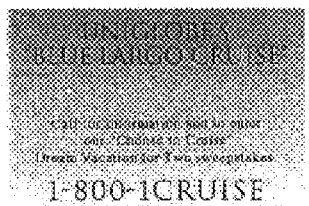
20,000 Same Day Distribution     Interactive 800 Number
*Quotation is valid for 30 days and will be subject for review after this period.*

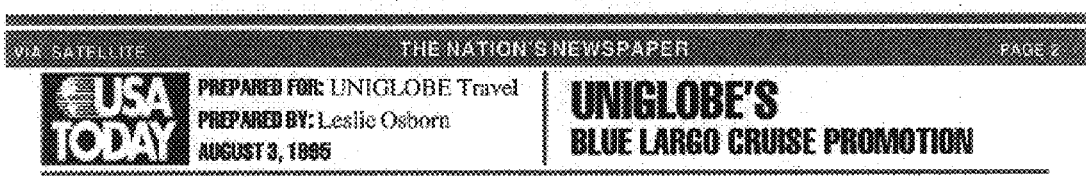

Table of Contents

OBJECTIVES/STRATEGIES/TACTICS
    Objectives/Strategies/Tactics ................................................................................................ 3

USA TODAY
    Awards .................................................................................................................................. 4
    Life Section Editorial ........................................................................................................... 6

CIRCULATION
    Totals .................................................................................................................................... 7
    Growth .................................................................................................................................. 8

KEY AUDIENCE INFORMATION
    USA TODAY *Ranks # 1 in Travel Advertising Pages* ........................................................ 9
    USA TODAY *Reaches Frequent Leisure Travelers* ......................................................... 10
    USA TODAY *Readers Need a Vacation* ........................................................................... 10
    USA TODAY *Reaches Readers and Travelers Not Found in Other Publications* ........... 11

PROGRAMS
    TV Grid .............................................................................................................................. 12
    Interactive 800 Number & Direct Mail Program .............................................................. 13

QUOTE
    Quote .................................................................................................................................. 14

Fig. 20C

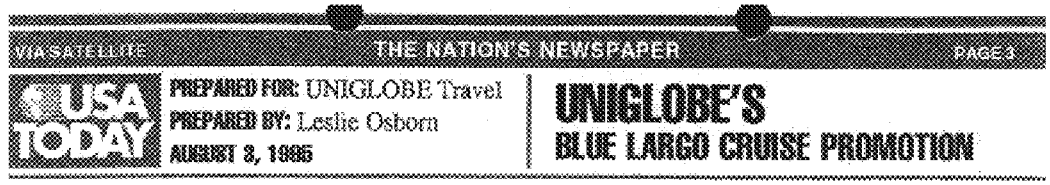

Objectives/Strategies/Tactics

Objectives
- Increase consumer bookings/reservations for UNIGLOBE Travel and its "Blue Largo Cruise" promotion
- Heighten awareness for UNIGLOBE Travel with those leisure travelers across the USA most likely to buy
- Generate broad awareness of the advantages of cruising as the preeminent vacation category
- Create excitement among travel agents for "Blue Largo Cruise" promotion

Strategy
- Conduct a continuous advertising campaign for UNIGLOBE Travel's "Blue Largo Cruise" promotion in a national publication that reaches responsive readers within a complementary editorial environment
- Implement a consumer promotion that increases travel agency traffic during "Blue Largo Cruise" promotion
- Develop multimedia advertising to inform travelers about the advantages of a cruise vacation
- Generate travel agent enthusiasm for "Blue Largo Cruise" promotion

Tactics
- Take advantage of USA TODAY's daily presence to build excitement, impact and awareness of "Blue Largo Cruise" promotion
- Advertise continually to target UNIGLOBE Travel's key prospects—leisure travelers—in USA TODAY'S Life section (16 full-page ads for 4 weeks, Monday - Thursday; below Today's TV Grid, Friday)
- Employ an advertising program in USA TODAY to highlight advantages of a cruise vacation and UNIGLOBE Travel services to the USA's most frequent travelers
- Implement travel trade advertising that broadens awareness of "Blue Largo Cruise" promotion among UNIGLOBE travel agents

Fig. 20D

VIA SATELLITE — THE NATION'S NEWSPAPER — PAGE 1

USA TODAY
PREPARED FOR: UNIGLOBE Travel
PREPARED BY: Leslie Osborn
AUGUST 3, 1995

UNIGLOBE'S BLUE LARGO CRUISE PROMOTION

USA TODAY Awards

Awards for Excellence

Revealing investigative reports. Compelling photography. Hard-hitting coverage of the stories that affect our lives. Since 1993, USA TODAY has won 22 awards for its editorial leadership and innovation. These accolades merely underscore what more than 5.5 million affluent daily readers already know- that USA TODAY is the place to look for cutting-edge coverage and a quality editorial product.

REPORTING AWARDS

Sam Meddis
▶ Unity Awards in Media, First Place in Investigative Reporting category for "Is the Drug War Racist?" (1994)
▶ American Bar Association Silver Gavel Award for "Is the Drug War Racist?" (1994)
▶ National Council on Crime and Delinquency 1994 Pass award - *Awarded for news coverage that produced new levels of awareness and understanding about complex crime issues.*
National Council on Crime and Delinquency 1993 Pass award - *Awarded for investigative story on crime platforms of the three 1992 presidential candidates.*

Dennis Kelly, Tamara Henry, Anita Manning, Michelle Healy, Nicole Carroll and Mary Beth Marklein

▶ 1994 EdPress Award, First Place in Special Section category for "Into the Mainstream" - *Sponsored by the Educational Press Association of America, this award recognizes significant and excellent achievement in educational journalism.*
▶ JCPenney - Missouri Lifestyle Awards, Finalists in Regularly Scheduled Feature Supplement, for USA TODAY's education section (1994)
▶ National Easter Seals EDI Award (1993) - *Awarded for media efforts in promoting equality, dignity and independence of people with disabilities.*
▶ To Dennis Kelly and Tamara Henry: Easter Seals Award in the News category for "A Classroom Clash: Where should disabled kids be taught?" (1994)

Paul Hoversten
▶ Aviation/Space Writers Association, First Place Award for Hubble telescope rescue coverage (1994)
▶ National Space Club's 1993 Media Award - *For coverage of the space shuttle's dramatic rescue and subsequent reboost of the stranded Intelsat satellite by three spacewalking astronauts. Past winners include Edward R. Murrow and Jack Anderson.*

Tom Squitieri
▶ White House Correspondents Association's Raymond Clapper Award (1994) - *Recognizing outstanding reporting on Bosnia, Burundi and Haiti.*
▶ Barnet Nover Memorial Excellence Award (1993) - *Award for investigative story on crime platforms of the three 1992 Presidential candidates.*

Dennis Cauchon
▶ Mencken Award for Best Investigative Series (1993) - *The Mencken Awards honor first-rate work that illuminates issues of human rights and freedom. Dennis Cauchon was recognized for articles on law enforcement abuse of asset forfeiture laws.*

Jim Harney
▶ Oscars in Agriculture (1993) - *Recognizes excellence in agricultural reporting and is awarded by the University of Illinois. Harney's story on the effect of taxes on tobacco farmers in North Carolina was honored.*

Judi Hasson
▶ Women's Political Caucus EMMA (1993) - *The president of the Women's Political Caucus awarded this special citation of excellence for overall coverage of 1992 Presidential Campaign.*

Wanda Lloyd
▶ Ida B. Wells Award (1993) - *Award recognizes the individual*

*GWC CONFIDENTIAL AND PROPRIETARY*

Fig. 20E

PREPARED FOR: UNIGLOBE Travel
PREPARED BY: Leslie Osborn
AUGUST 2, 1996

UNIGLOBE'S BLUE LARGO CRUISE PROMOTION

USA TODAY Awards

Awards for Excellence (cont.)

who has provided exemplary leadership in opening the doors of employment opportunities for minorities in American journalism. Wanda Lloyd is the first woman to receive this award which is sponsored by the National Association of Black Journalists and the University of Kansas School of Journalism.

Finalists Denise Tom and Sally Pollock
▶ Miller Lite Women's Sports Journalism Awards (1993) - Award recognizes stories that show sensitivity to the female as a performer and achiever in sports.

James Jones IV
▶ African-American Music Foundation Award (1993)

GRAPHICS, DESIGN, PHOTOGRAPHY AWARDS

American Journalism Review

▶ "Best in the Business" Awards, USA TODAY named Best Designed Newspaper, 1994

Darr Beiser
▶ White House Press Photographers' Association Award for Sports action (1994)

Bert Hanashiro
▶ Annual Pictures of the Year Competition, Award of Excellence for Sports action (1993)

Bruce Schwartz
▶ 1993 EdPress Award for Graphic treatment of the All USA Academic Team page - *Sponsored by the Educational Press Association of America, this award recognizes significant and excellent achievement in educational journalism.*

CWC CONFIDENTIAL AND PROPRIETARY

Fig. 20F

| VIA SATELLITE | THE NATION'S NEWSPAPER | PAGE 6 |

USA TODAY — PREPARED FOR: UNIGLOBE Travel / PREPARED BY: Leslie Osborn / AUGUST 3, 1995

UNIGLOBE'S BLUE LARGO CRUISE PROMOTION

Life Section Editorial

She snoops, she scoops and she's in the Life section every Tuesday–Friday.

*CWC CONFIDENTIAL AND PROPRIETARY*

Fig. 20J

VIA SATELLITE — THE NATION'S NEWSPAPER — PAGE 10

PREPARED FOR: UNIGLOBE Travel
PREPARED BY: Leslie Osborn
AUGUST 3, 1995

UNIGLOBE'S
BLUE LARGO CRUISE PROMOTION

Key Audience Information

USA TODAY Reaches Frequent Leisure Travelers

| | Number of leisure travelers who read (000) | Percent coverage |
|---|---|---|
| Reader's Digest | 7,967 | 32% |
| National Geographic | 6,608 | 26% |
| USA TODAY | 6,503 | 26% |
| Time | 5,766 | 23% |
| Newsweek | 5,123 | 21% |
| Wall Street Journal | 5,016 | 20% |
| People | 4,576 | 18% |
| Sports Illustrated | 4,263 | 17% |
| Modern Maturity | 4,103 | 16% |
| U.S. News & World Report | 3,908 | 16% |

USA TODAY Readers Need a Vacation

| | Aud (000) | % Comp | % Covg | Index |
|---|---|---|---|---|
| Prefer to travel far from home for leisure | 4,464 | 69% | 27% | 104 |
| Plan to take a "sun and sand" vacation next 3 years | 2,520 | 39% | 32% | 121 |
| Expect leisure travel to increase next 3 years | 3,496 | 18% | 30% | 105 |
| Have ever taken a cruise | 1,965 | 30% | 27% | 105 |

CWC CONFIDENTIAL AND PROPRIETARY

Fig. 20K
Key Audience Information
USA TODAY Reaches Readers and Travelers Not Found in Other Publications
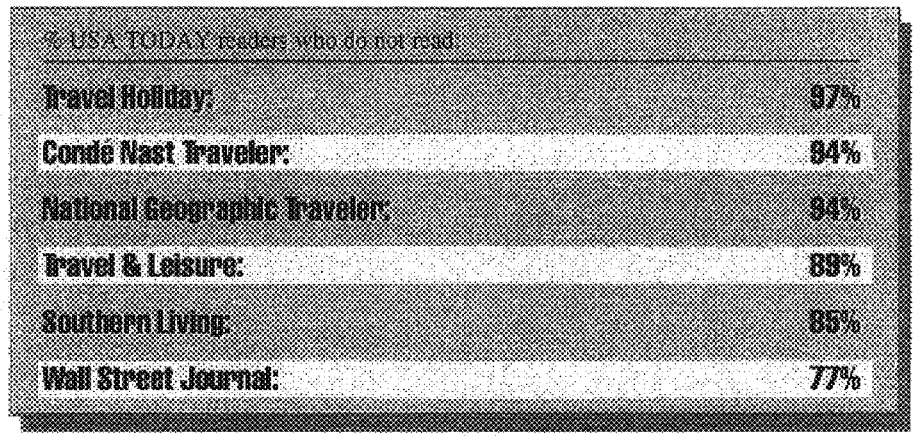

Fig. 20L

Programs

TV Grid

Where do more than 5.5 million affluent readers look first to find out what's on TV? USA TODAY's TV Grid. On the back page of USA TODAY's Life section, this prominent 4-color page features all the network line-ups, cable programming and our critic's choices for quality viewing. Anchoring the page is a stand-out positioning opportunity for advertisers looking to reach USA TODAY's audience of broadcast viewers.

FLEXIBLE SCHEDULING and DISCOUNTED FREQUENCY

A horizontal third-page position is available to advertisers on a one time basis or as part of a continuity program. The following pricing plan applies to TV Grid advertising schedules.

Domestic Edition Pricing

|  | Mon-Th | Friday | Effective Discount |
|---|---|---|---|
| Base Rate | $49,300 | $56,400 | – |
| 13x | 44,370 | 50,760 | 10% |
| 26x | 36,975 | 42,300 | 25% |
| 52x | 32,045 | 36,660 | 35% |

Worldwide Pricing

|  | Mon-Th | Friday | Effective Discount |
|---|---|---|---|
| Base Rate | $56,700 | $64,800 | – |
| 13x | 51,030 | 58,320 | 10% |
| 26x | 42,525 | 48,600 | 25% |
| 52x | 36,855 | 42,120 | 35% |

OTHER DISCOUNTS MAY APPLY

- Advertisers who have regular rate card volume contracts that provide higher discounts than those listed above *will* be allowed to apply those discounts to the base unit prices indicated on the pricing schedule.
- Advertising volume accrued under this program *will* count towards fulfillment of volume contracts and VIP agreements.
- VIP bonus space earned under this program *can* be ordered to run on the TV Grid page.
- Advertisers participating under special discount programs such as the Flat Rate Program or the Broadcast Buying Program *cannot* use the discounts achieved through those programs to purchase schedules on the TV Grid page.

For more information on USA TODAY's TV Grid, contact your USA TODAY sales representative.

Fig. 20M

| VIA SATELLITE | THE NATION'S NEWSPAPER | PAGE 13 |

USA TODAY — PREPARED FOR: UNIGLOBE Travel
PREPARED BY: Leslie Osborn
AUGUST 3, 1995

UNIGLOBE'S BLUE LARGO CRUISE PROMOTION

Programs

Interactive 800 Number

As a special "value-add," USA TODAY will provide UNIGLOBE Travel with an interactive 800number. A customized UNIGLOBE Travel "Blue Largo Cruise" promotion "Choose to Cruise" 800-number hotline can provide one or all of the following services:

- Fulfillment of copy requests for UNIGLOBE Travel's USA TODAY advertorial
- Consumer survey opportunities
- Travel agent sweepstakes entry vehicle USA TODAY will provide UNIGLOBE Travel with program set-up and administration, and accept up to 10,000 calls during the promotion period. Once survey information is gathered, USA TODAY can transcribe, analyze, and provide the geographic breakdown of information.

Direct Mail Program

The day of the kick-off of the UNIGLOBE Travel promotion, each of UNIGLOBE Travel's 20,000 member travel agencies will receive a complimentary copy of USA TODAY featuring UNIGLOBE'S advertorial in the mail.

COMPUTER GENERATED PRESENTATION SYSTEM

BACKGROUND OF THE INVENTION

The present invention is directed to a sales presentation generation system and, more particularly, to a system which integrates customer specific information with a selling entity element to generate a presentation customized for a particular customer in a manner which reinforces the identity of the selling entity.

The following description and related drawings include reference to a number of trademarks. The inclusion of these trademarks is for purposes of clarity and illustration only and does not express or imply any connection between the owners of the trademarks and the invention or between the owners of the trademarks and the assignee of the invention.

Sales representatives currently use a number of techniques and methods to present a product to a customer. These techniques may include sales proposals or presentations, such as PowerPoint (TM) slide presentations, videos, and the like. Typically, sales proposals generally fall into two distinct categories. On one hand, sellers often use "brochures" to generally market their products. These brochures provide information about the seller generic to any type of customer, and in doing so convey a strong sense of the seller's "look" or identity. On the other hand, seller's may create customized proposals to target a specific customer or group of customers. As the degree of customization increases however, the "look" or identity of the seller tends to be lost. Other presentations, such as slide shows, suffer from the same tension between customization for a particular customer and the desire to maintain the "image" or "look" of the selling entity.

SUMMARY OF THE INVENTION

The present invention provides a system for creating sales presentations. The system integrates customer specific information with a selling entity element to generate a presentation customized for a particular customer in a manner which reinforces the identity of the selling entity. Accordingly, the present system significantly enhances the impact of sales presentations and the likelihood of consummating a sale.

In one particular embodiment, there is provided a computer system implemented method and apparatus for generating a customized presentation for a customer of a selling entity to facilitate a sale of a product offered for sale by the selling entity to the customer. The computer system includes a memory arrangement and at least one processing unit. The computer system stores, in the memory arrangement, selling entity elements having a corresponding impression characteristic which the customer of the selling entity identifies with the selling entity.

The computer system develops a customer solution for the customer based on customer information, received in the computer system, representing the customer's interest in the product.

A selling entity element is retrieved from the stored selling entity elements and a presentation item is generated by integrating customer solution information with the retrieved selling entity element to reflect a portion of the customer solution in a manner which maintains the corresponding impression characteristic of the retrieved selling entity element. Finally, the presentation item may be output for presentation of the customer solution to the customer in a manner which reinforces the identity of the selling entity.

In another embodiment, a computer is provided which generates customized proposals to facilitate a sale of a product offered for sale by the selling entity to different types of customers. The computer system includes a memory arrangement and at least one processing unit. One or more selling entity elements and one or more customer type elements are stored in the memory arrangement. The selling entity elements are identifiable with the selling entity by customers of the selling entity, and the customer type elements correspond to the different types of customers for the product offered for sale by the selling entity.

The computer system receives customer profile information of a particular customer and also receives information indicative of the particular customer's interests in the product. Based on the customer's interest in the product, a customer solution is generated for the particular customer. A customer type of the particular customer is determined from the customer profile information. The computer system retrieves, from the customer type elements, a customer type element corresponding to the customer type of the particular customer, and retrieves a selling entity element from the plurality of selling entity images. The retrieved customer type element and the retrieved selling entity element are then integrated into an integrated presentation customized for the particular customer based on the customer solution.

These and various other features as well as advantages of the invention are pointed out with particularity in the claims annexed hereto and form a part hereof. However, for a better understanding of the invention and its advantages reference should be made to the drawings which form a further part hereof, and to the accompanying descriptive matter, in which there is illustrated and described various embodiments of a system in accordance with the invention.

BRIEF DESCRIPTION OF THE DRAWINGS

The invention may be more completely understood by consideration of the following detailed description of various exemplary embodiments of the invention in conjunction with the accompanying drawings, in which:

FIG. 5 is an example presentation output constructed using the template of FIG. 4;

FIGS. 15–17 illustrate sample presentation pages for comparison.

DETAILED DESCRIPTION OF THE DRAWINGS

Figure 1:
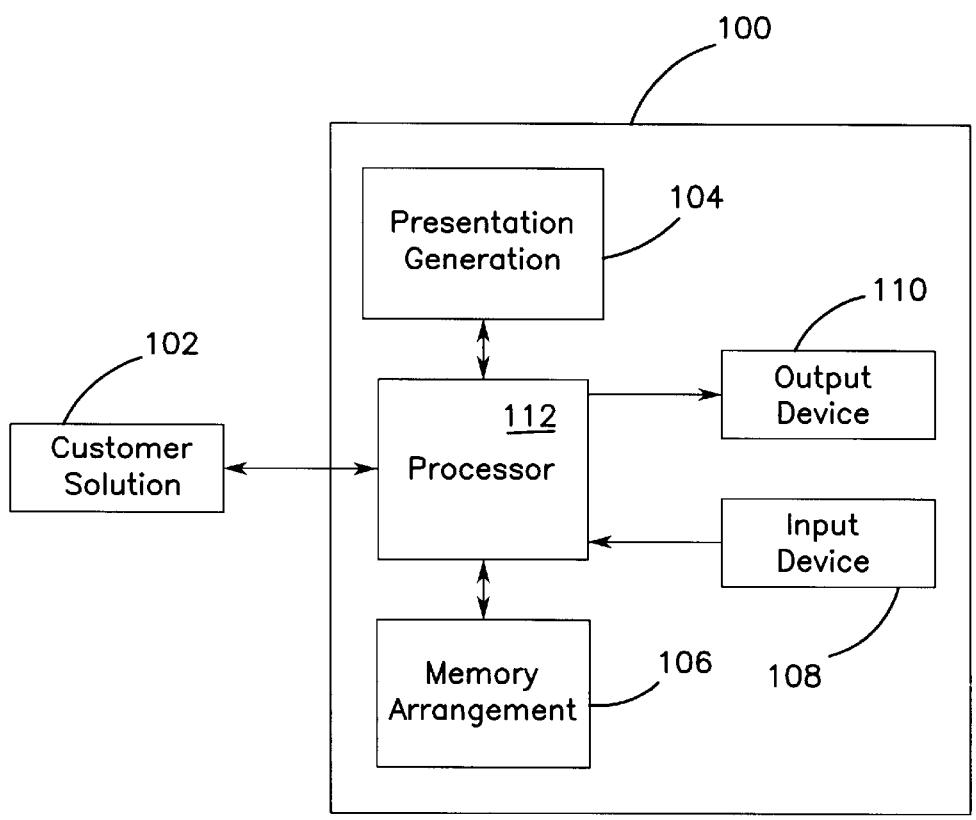
FIG. 1 is a block diagram illustrating a sales presentation system in accordance with one exemplary embodiment of the invention.

The present system is a sales presentation generation system which integrates customer specific information with a selling entity element to generate a presentation for the sale of a product customized for a particular customer of the selling entity. The presentation item may be any type of audio and/or visual output, including an image, such as text or graphics, a video clip, or an audio clip, and may be output in a variety of manners, such as a proposal in hard copy or a multimedia presentation.

In one particular embodiment of the invention, the customized presentation item is constructed in a manner which reinforces the identity of the selling entity element by integrating customer solution information with a selling entity element having an impression characteristic which indirectly convey the identity of the selling entity. In this particular embodiment, a portion of the customer solution may be presented to the customer in a manner which maintains such impression characteristics of the selling entity element so as to convey a desired impression or identity of the selling entity. As will be discussed further below, the selling entity elements may be, for example, images, templates and/or audio information having impression characteristics which customers identify with the selling entity.

In accordance with another aspect of the invention, a presentation item which may be generated using an embodiment of the invention may be further, or in the alternative, customized according to the type of customer to which the presentation is directed. Accordingly, the present system significantly enhances the impact of sales presentations and the likelihood of consummating a sale and takes advantage of the goodwill fostered by the customer's "image".

A sales presentation generation system in accordance with one particular embodiment accesses customer information collected during a sales process, generates integrated sales presentation items based on the customer information, and presents the integrated sales presentation items to a user. For explanation herein, sample sales proposals of the type which may be generated by a sales presentation system in accordance with the present invention are provided as FIGS. 18 and 19, portions of which are reproduced as figures. In describing various aspects of the system reference will often be made to these sales proposals. While the samples are proposals directed to sales of advertising space in a newspaper and to sales of legal services, the invention extends to cover sales presentations for any type of product which would be amenable for use in connection with the described features and aspects of the invention. Furthermore, the term product, as used herein, is intended to cover anything offered by a selling entity, including tangible items and services.

Exemplary sales systems which may be used to implement the various functionality described herein for gathering and using customer information in a sales environment are disclosed in U.S. patent application Ser. No. 08/692,045, filed Aug. 2, 1996, entitled "Computer Advertisement Sales System," U.S. patent application Ser. No. 08/550,089, filed Oct. 30, 1995, entitled "Integrated Computerized Sales Force Automation System" and U.S. patent application Ser. No. 08/744,169, filed Nov. 5, 1996, entitled "Sales Presentation System," each of which share common ownership with the present application and are herein incorporated by reference.

FIG. 1 is a block diagram functionally illustrating an exemplary sales presentation system 100 shown coupled with a customer solution system 102. The sales presentation system 100 includes a presentation generation system 104, a memory arrangement 106, an input device 108, such as a keyboard, an output device 110, such as a monitor, a speaker, and/or a printer, and a processor 112. Generally, the customer solution system 102 is an interactive system used by the sales representative or a customer to collect customer information and create a customized customer solution based on the customer information. It is noted that the customer solution system 102 may be separate from or integrated with the presentation system 100. What is required is that the customer solution system 102 and presentation system 100 be arranged to commonly exchange information.

The presentation generation system 104 provides an automated tool for integrating customer specific information, typically collected using the customer solution tool 102, with a particular selling entity element to generate a presentation item customized for the particular customer. The presentation generation system 104 may, for example, be used by the sales representative to create a customized sales proposal for the customer or the presentation generation system 104 may itself automatically combine presentation items to generate a presentation. The customer specific information may be customer solution elements, such as images, audio information or data, representing a portion of the customer solution, which is integrated with the selling entity element to reflect the portion of the customer solution in a manner which maintains and reinforces the identity of the selling entity in a manner more fully described below. The customer specific information may include or also be an element representing the type of customer for which the presentation is being prepared. For example, a different element might be used for a computer type customer than for an automotive products type customer. The customer solution system 102 and presentation generation system 104 may be operationally coupled to the memory arrangement 106 so that each may access the data stored in the memory arrangement 106. The memory arrangement 106, customer solution system 102, and presentation generation system 104 are each discussed in more detail below.

The sales presentation system 100 may be implemented on a stand-alone computer operating independently or as part of a computer network or other computer arrangement suitable for use in the selling entity's sales environment. The system is particularly adaptable for use by a sales force located in the field. The system can be highly portable, with the sales representative being able to use the interactive technology while working directly with the potential customer. Because all the needed information is either available in the system or readily accessible, the sales representative is able to more easily close a sale while still with the customer, often at the customer's place of business. The sales presentation system 100 is also finely suited for use on the Internet. A customer may access the system via the Internet and input customer information from which a solution is developed. The presentation generation system may then automatically generate a presentation based on multiple presentation items and present the presentation to the customer over the Internet. The programs for providing the functionality of the system are primarily implemented using C++ or other object oriented programming languages. The visual interfaces of the various systems may be implemented using Visual Basic (TM) or equivalent interface programs.

The memory arrangement 106 may be one or more memories used by the various systems to store the relevant information. The memories may include fixed or removable data storage mediums, databases, RAMS and/or ROMS, and may be widely distributed, for example, on different computer platforms, etc. In one exemplary embodiment, the memory arrangement is implemented using industry standard relational database products. Alternative embodiments may implement the same functionality on object oriented databases or any other equivalent database structure.

The customer solution system 102 is provided to receive information concerning a particular customer and to generate a solution customized for the particular customer using the products being offered for sale by the selling entity. The sales presentation system 100 may be used with various customer solution systems.

The customer solution system 102 may include a customer tool which provides a convenient interface for entering customer information. This information may include a customer's profile such as corporate name, address, size, contact, industry, budget, specific interest in the products offered for sale, and other relevant information. In the advertising industry, for example, this information may include demographics of the customer's clientele, customer's industry, customer history, advertising requirements, etc.

The customer solution system may also include solution tools or modules for accessing and presenting product data, receiving the customer's preferences regarding the product data, generating a recommended product configuration, quoting a price or rate for a recommended product, presenting a competitive comparison between the recommended product and those of competitors, presenting financing options for the product, etc. The selling entity may have a number of different products offered for sale. The system may be used to present various options regarding the different products. In the advertising industry, product data may include advertisement medium, advertisement product features, advertisement length, broadcast time, broadcast coverage, etc. The customer information and the customer solution may be stored in the memory arrangement 106.

When used in the Internet environment, the customer solution system 102 may present to and receive from the customer input forms, such as HTML forms, in order to collect customer information. The customer solution system 102 may further receive Internet environment variables, such as CGI (Common Gateway Interface) environment variables, indicating customer specific information such as login address, terminal type, browser type, etc. These variables may then be used in the generation of a customer solution.

The presentation generation system 104 accesses the customer information and the customer solution, automatically generates presentation items based on the customer information and the customer solution. The presentation generation system 104 also provides the sales representative the tools for presenting the presentation items in a complete presentation document. The presentation generation system 104 includes a presentation item generation tool which may integrate among other things customer specific information with selling entity elements in a customized manner and a presentation generation tool which may interactively allow a sales representative to select desired presentation items to make a finalized sales presentation and/or which may itself automatically combine presentation items to generate a complete sales presentation.

The presentation item generation tool may, based on the customer solution, identify and retrieve selling entity elements having impression characteristics of the seller, identify and retrieve customer solution information, and generate a presentation item by integrating the selling entity element and the customer solution information in a manner which reinforces the impression characteristics of the selling entity element. The item generation tool may further identify a customer type based on the customer's information, retrieve an element reflecting the customer type, and integrate the customer type element with a selling entity element to generate a customized presentation item for the particular customer type. Embodiments of the presentation generation system 104 will be described in further detail below.

As described above, the presentation item generation system 104 may generate a variety of presentation items for a given customer and customer solution. The presentation item again may be any type of tangible representation, including visual and audio items. The presentation items may be highly customized for the customer without loosing the overall desired impression which conveys the "image" of the selling entity. Using the presentation generation tool, a sales representative may, for example, survey these presentation items and select a certain number of the presentation items to develop a final presentation. The presentation may then be provided to the customer, for example, as a printed proposal or a multimedia or slide presentation.

Illustrative presentations of the type which may be created using the present system are provided herein at FIGS. 18 and 19. In particular, FIGS. 18a–o illustrates a sales proposal prepared by USA Today (TM) to "Uniglobe Travel" for the sale of advertising space. As noted above, some of the selling entity elements used to generate a customized presentation may include impression characteristics which are designed to reinforce a "corporate image" of the selling entity. The term "corporate image" is used herein in a general sense and is not limited in reference to corporations.

As will be seen in the sample written proposal in FIG. 18 the proposal is customized to the potential customer and customer solution, while indirectly conveying a desired "corporate image" which captures and maintains a unique "look" associated with USA Today (TM) throughout the proposal. For example, the cover page of the proposal is identifiable as a front page of a USA Today (TM) newspaper product, through the use of appropriate image layout, organization, font, and color, among other things. In addition, the various graphs and graphics within the body of the proposal presentation are customized to the customer and/or the customer solution while retaining the "look" of graphs and graphics found in a USA Today (TM) newspaper and which advertisement space customers of USA Today (TM) would identify with USA Today (TM). This information is indirectly conveyed in the sense that it does not rely on USA Today trademarks, logos, etc., but draws its recognition from its correspondence to an "image" associated with USA Today (TM).

Figure 19A:
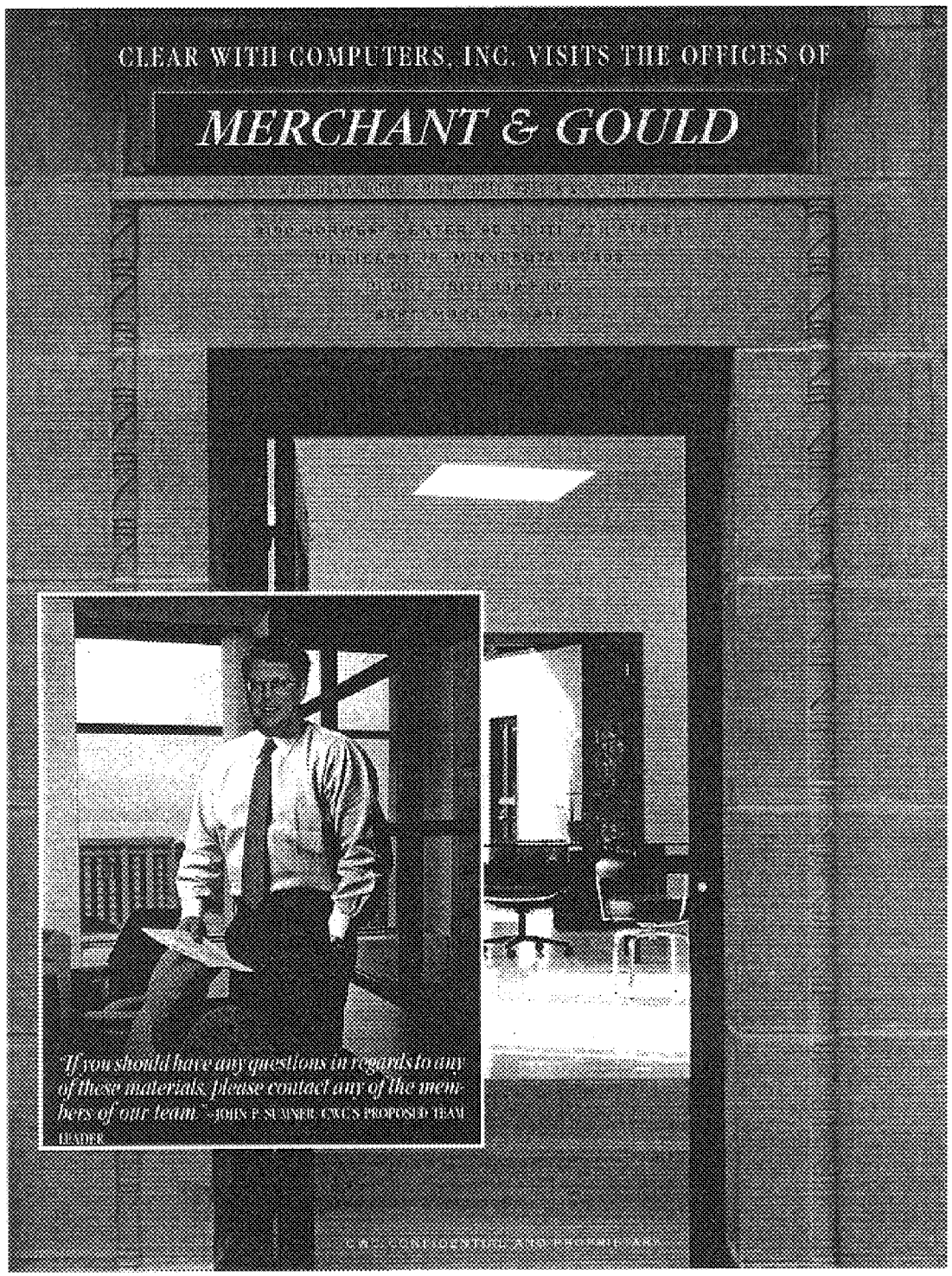
FIG. 19a–p illustrate an example proposal from CLEAR WITH COMPUTERS, INC. to MERCHANT & GOULD according to another embodiment of the present invention.
Figure 19B:
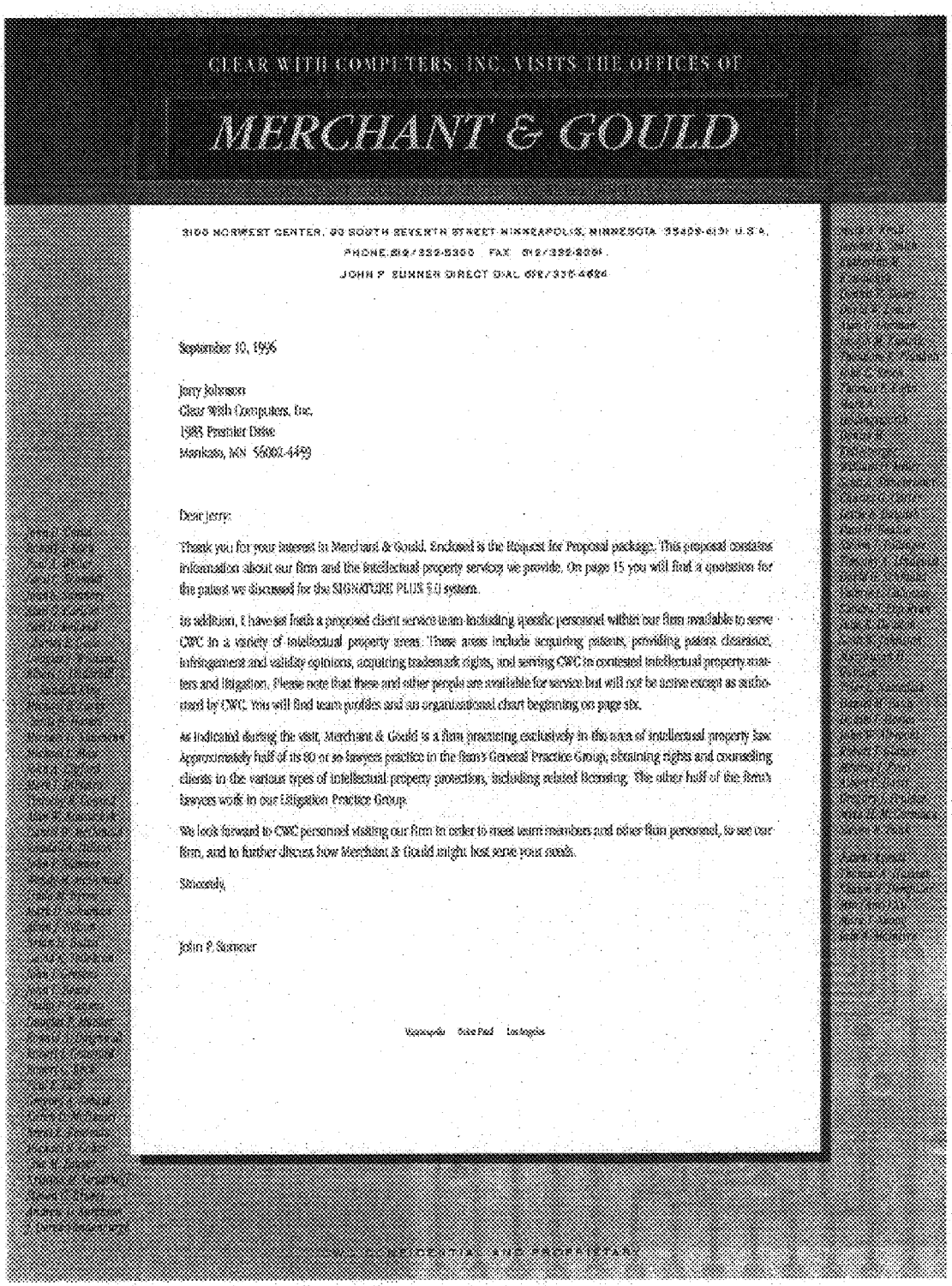
Figure 19C:
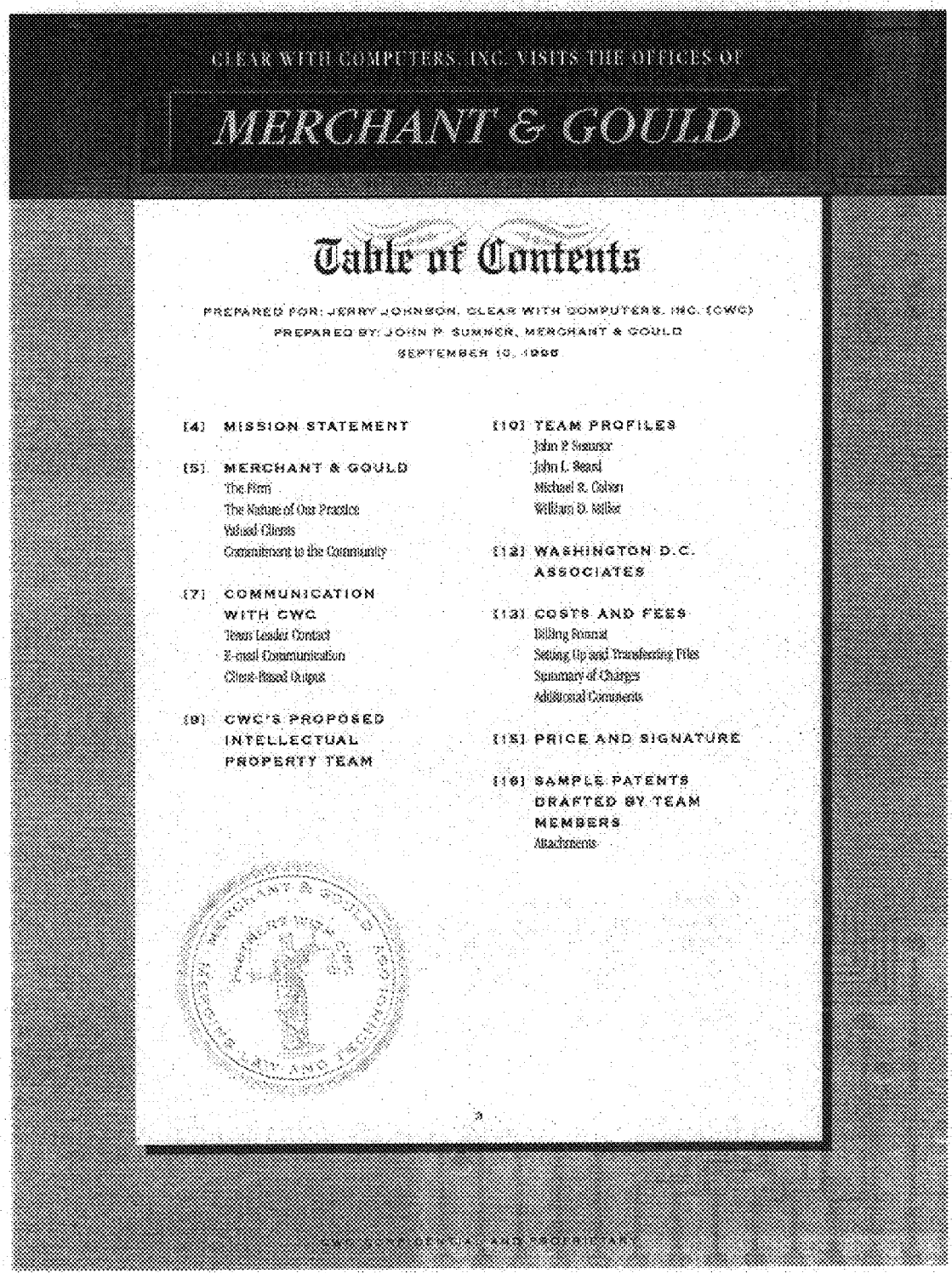
Figure 19D:
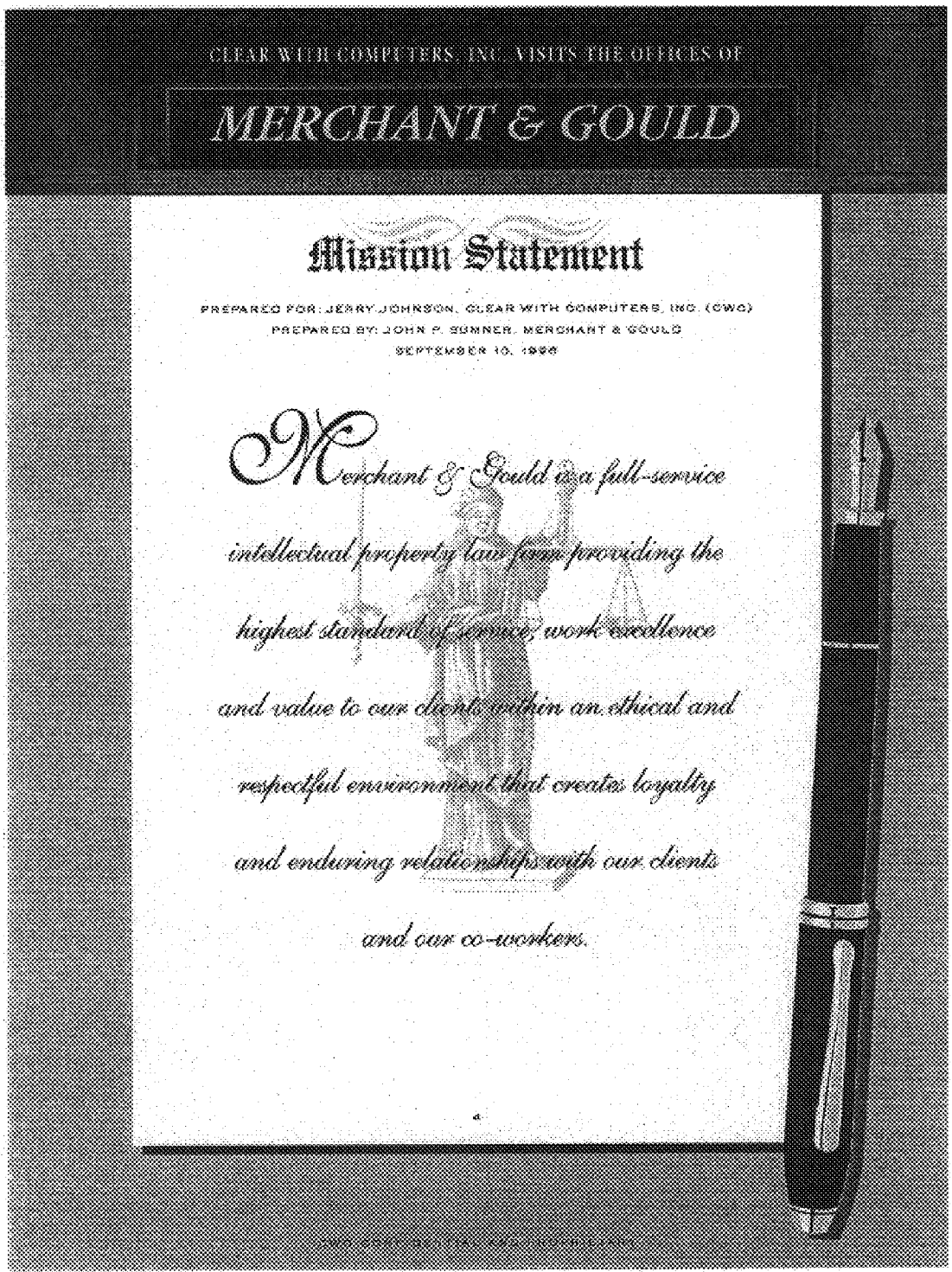
Figure 19E:
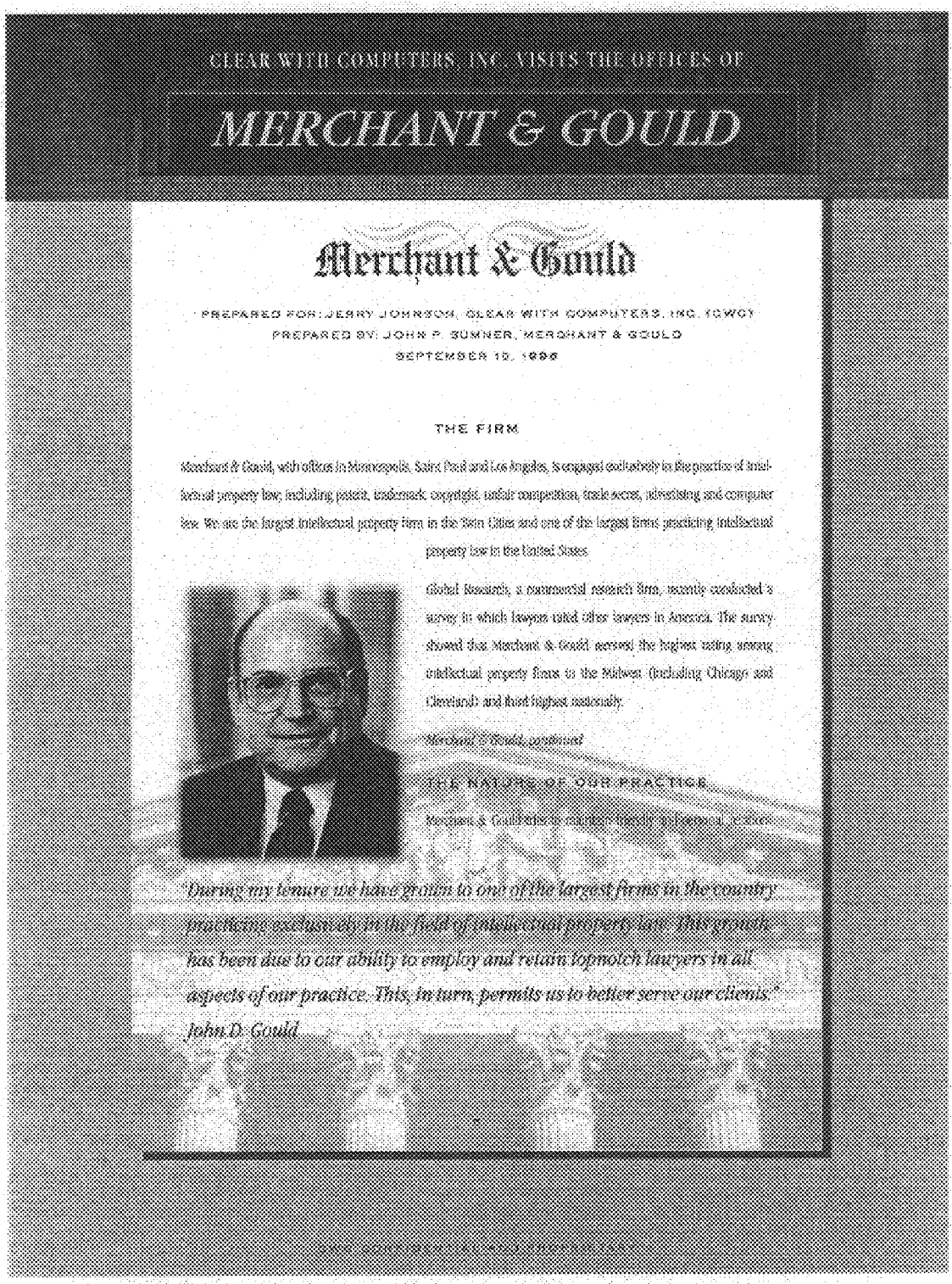
Figure 19F:
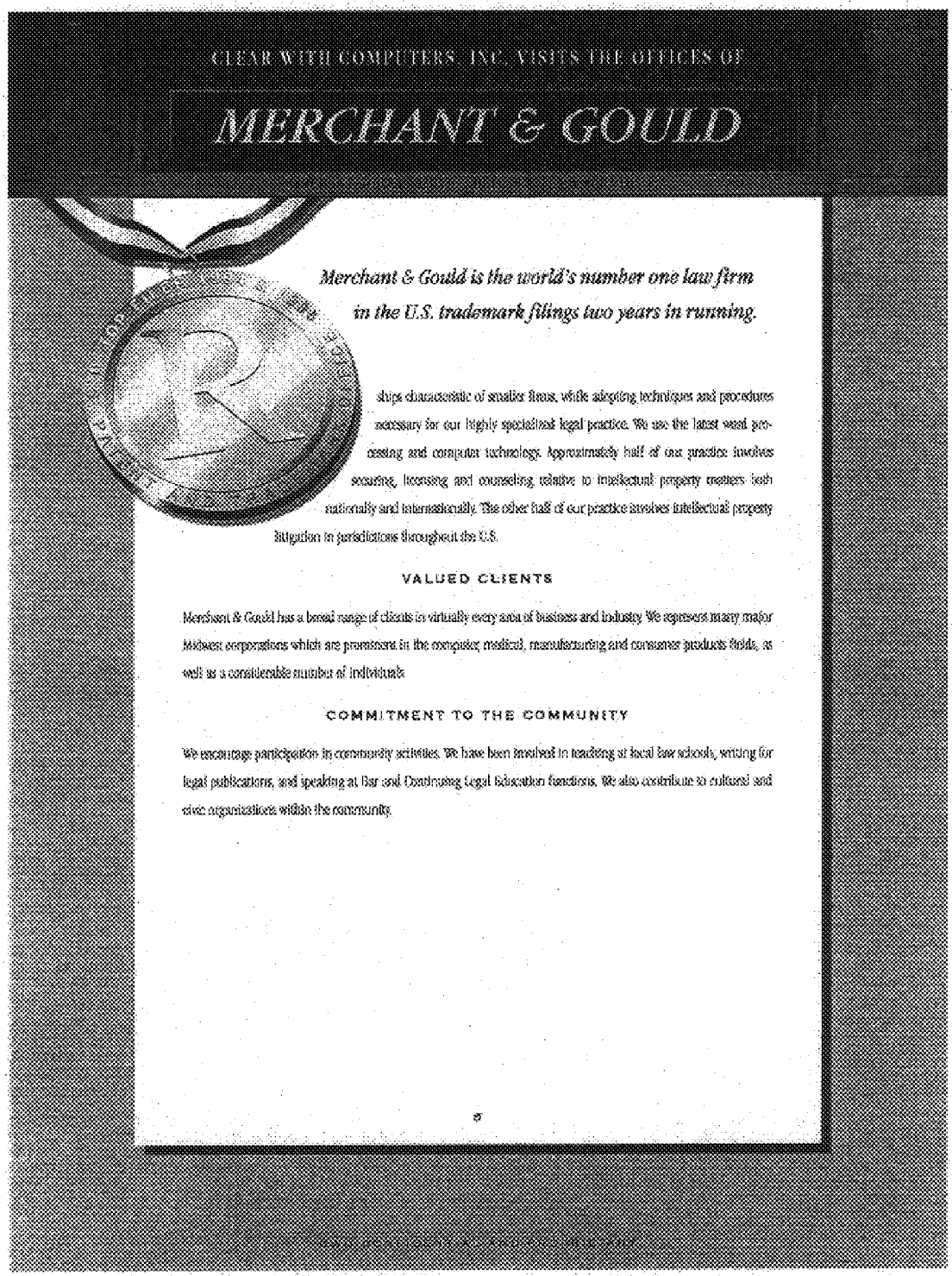
Figure 19G:
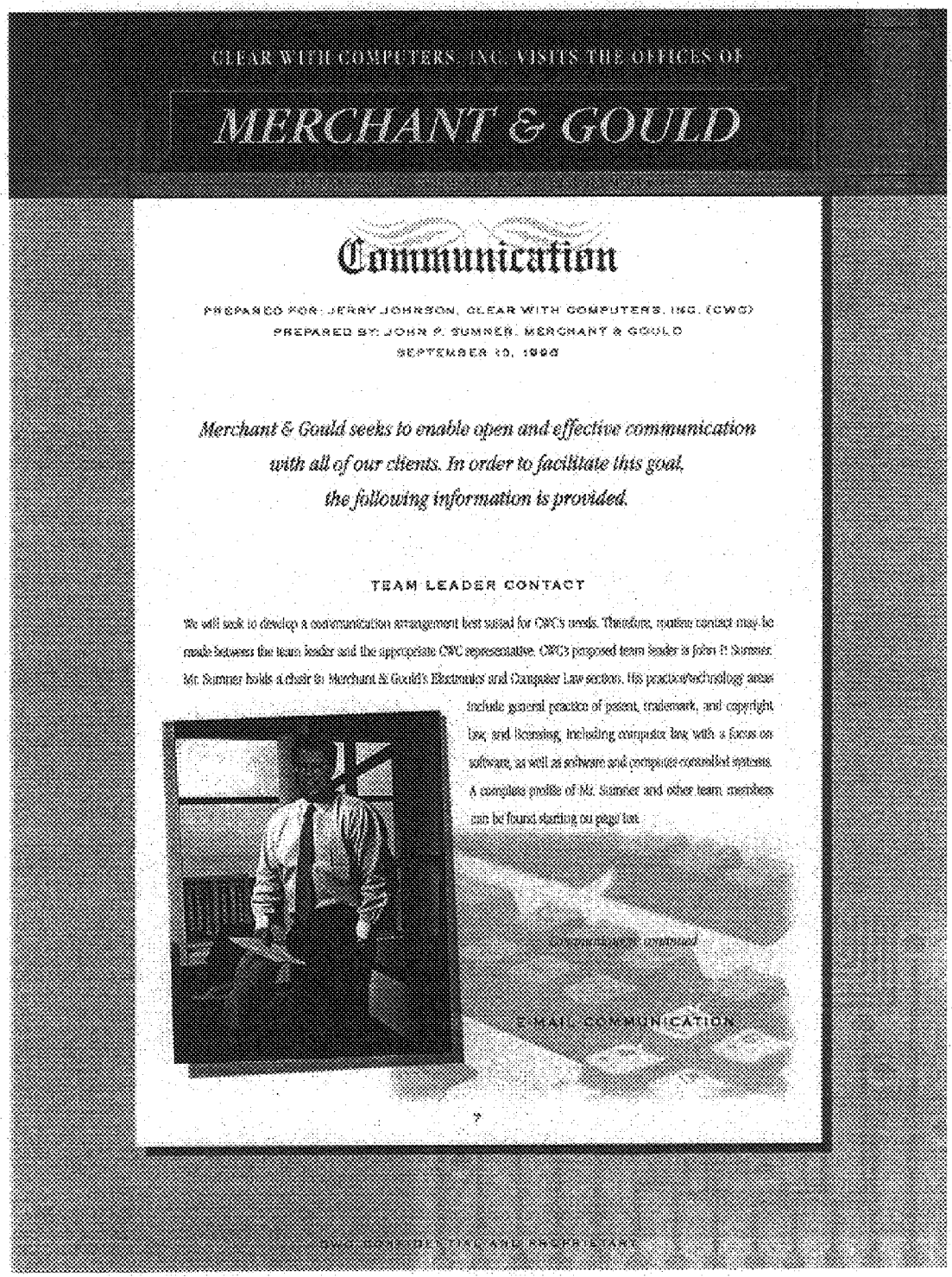
Figure 19H:
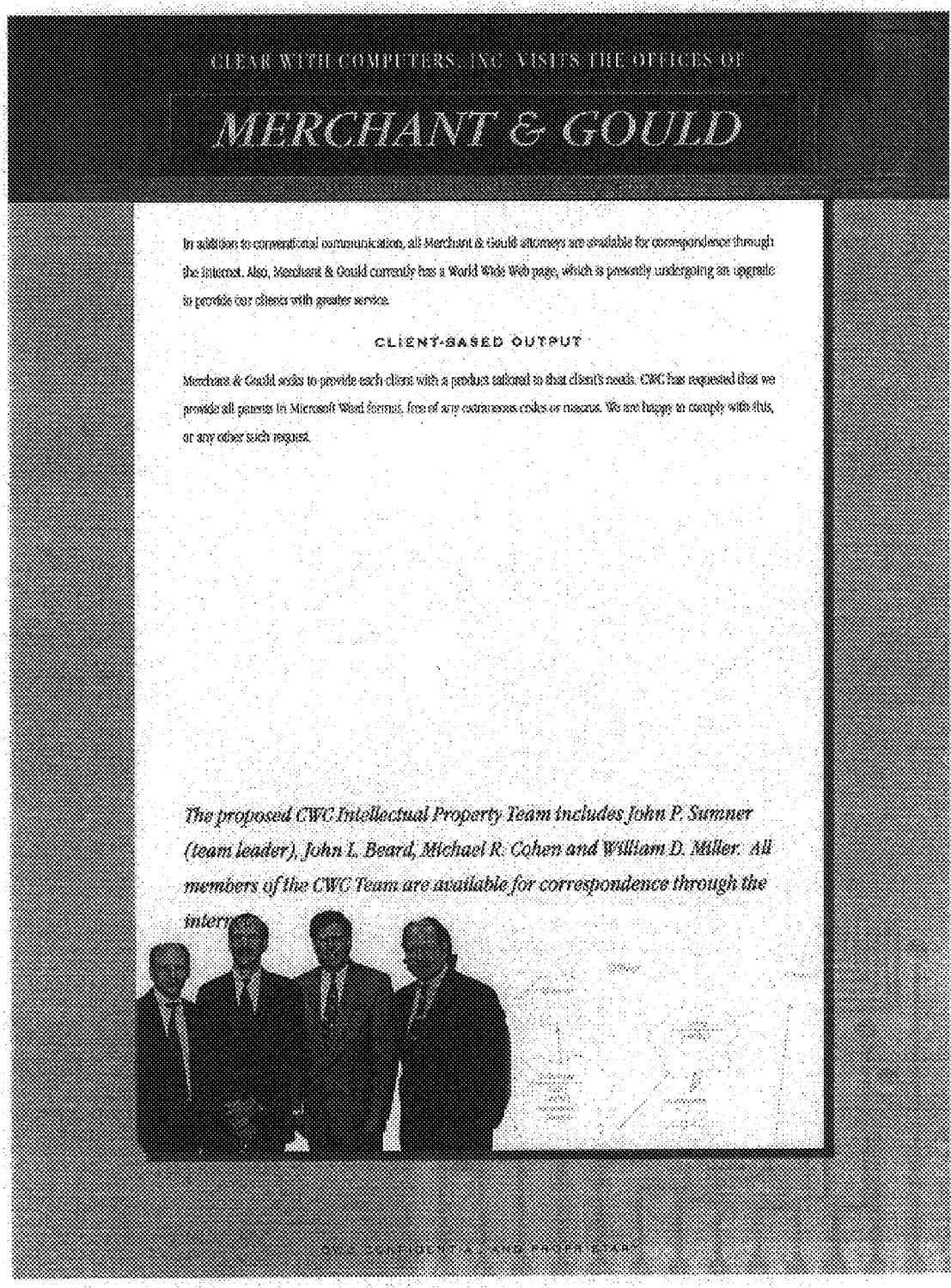
Figure 19I:
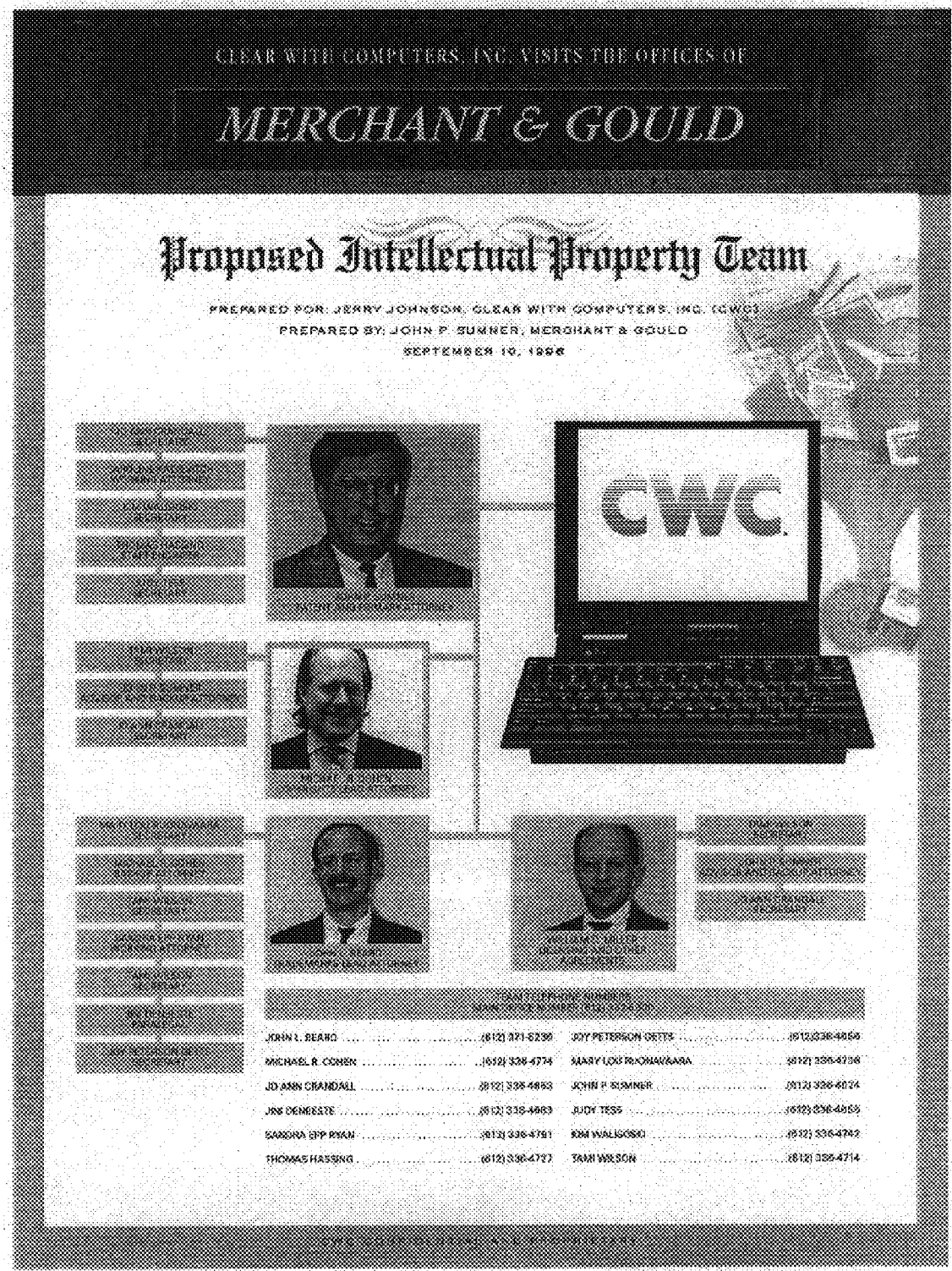
Figure 19J:
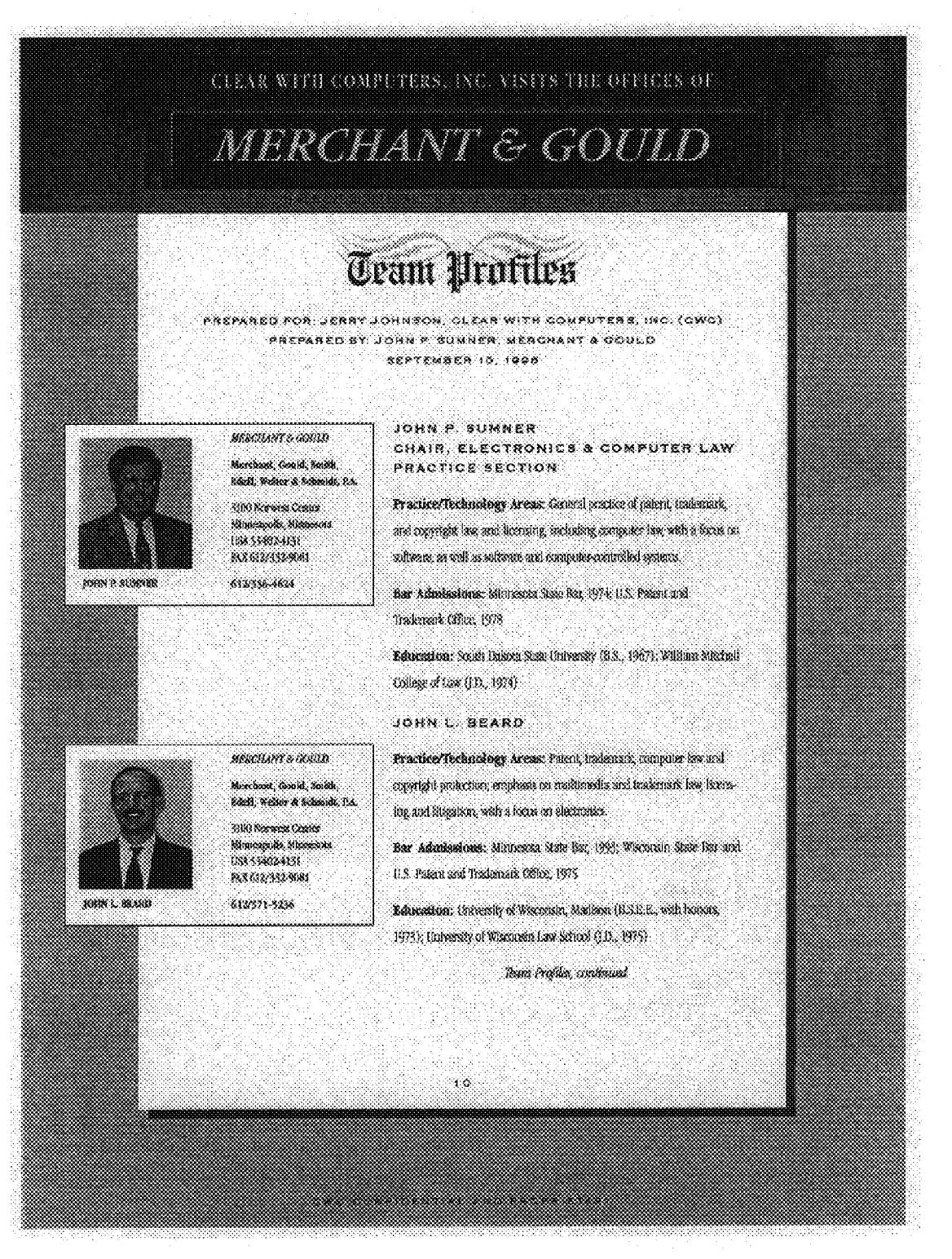
Figure 19K:
Figure 19L:
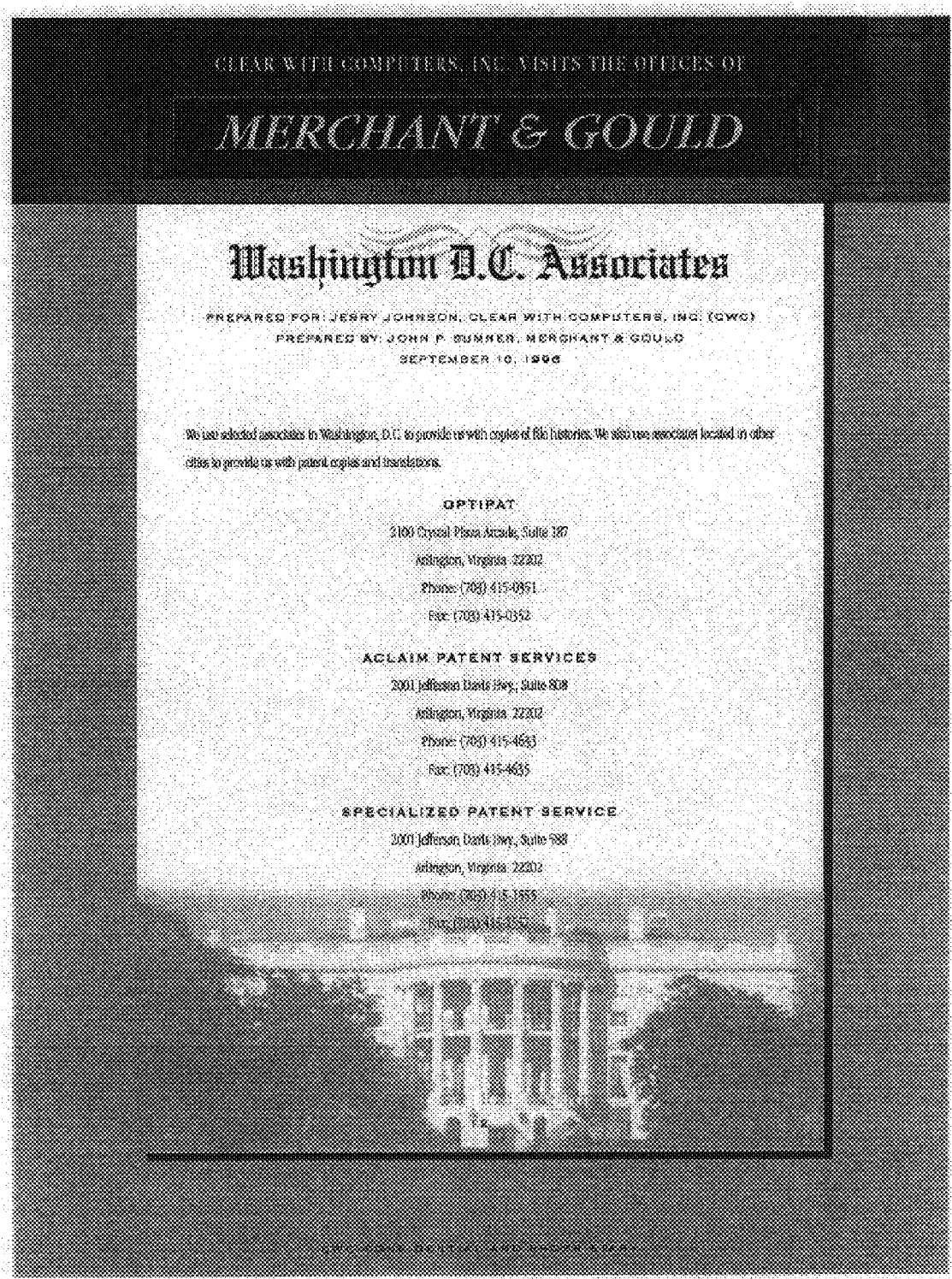
Figure 19M:
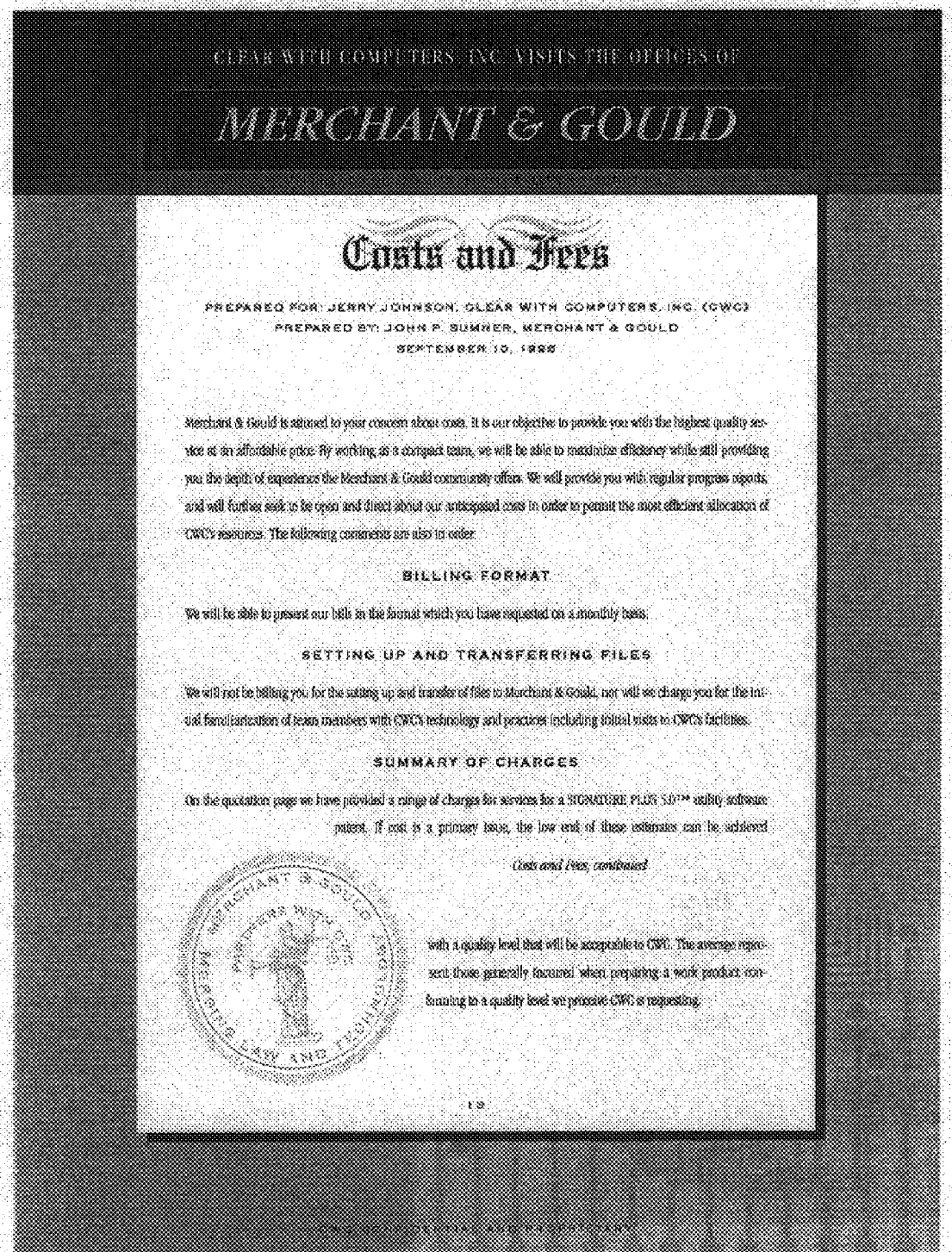
Figure 19N:
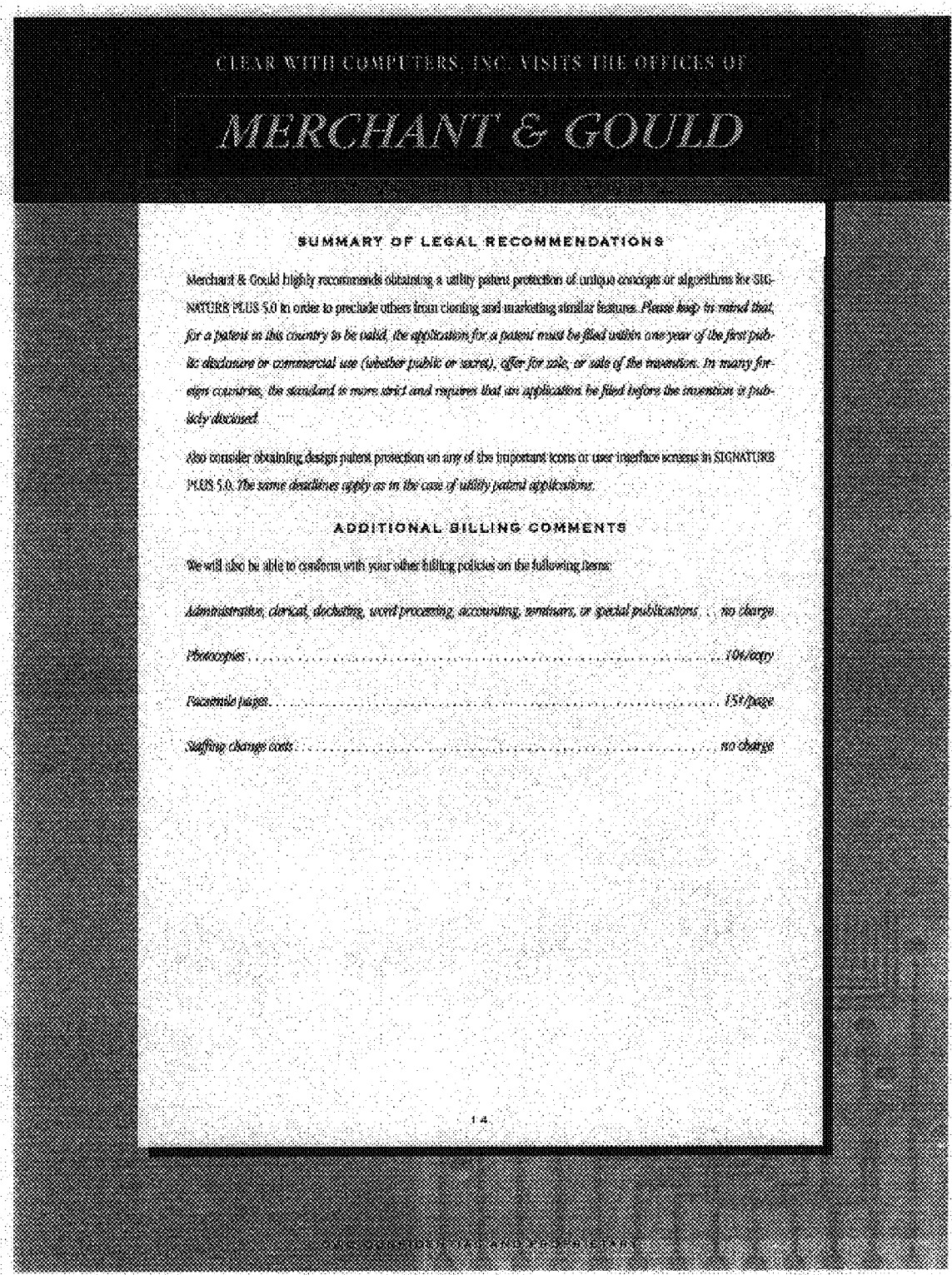
Figure 19O:
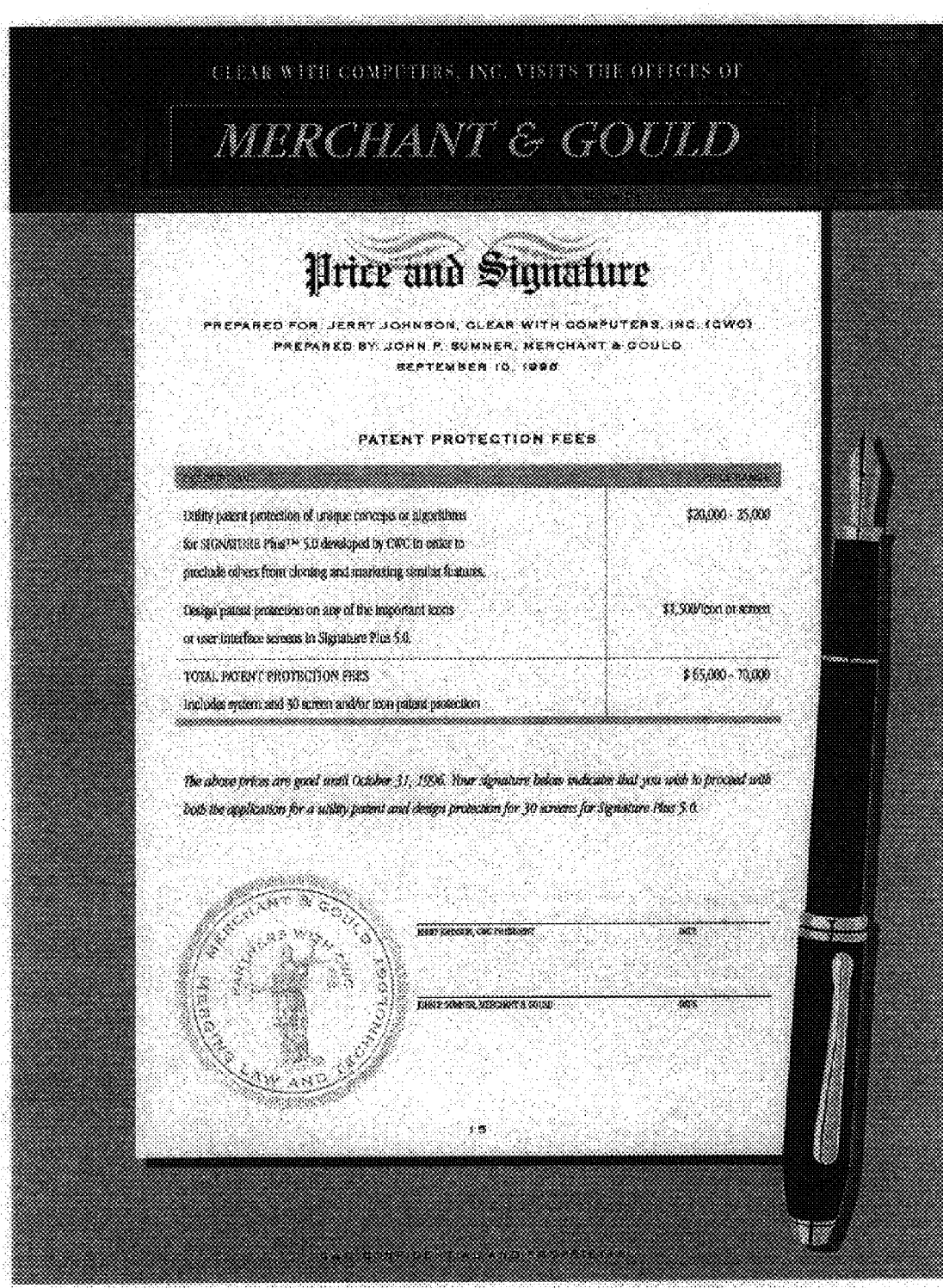
Figure 19P:
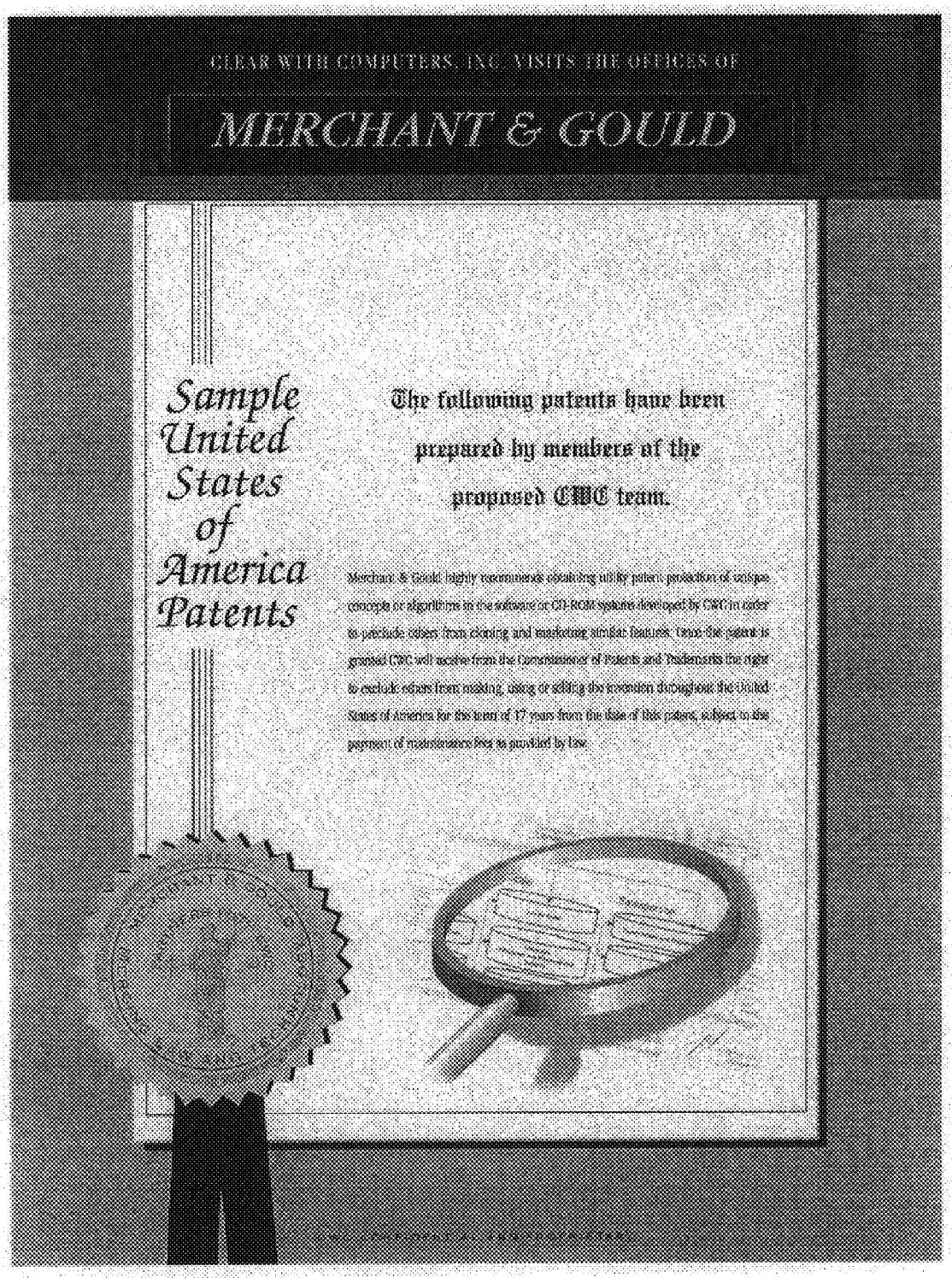

FIGS. 19a–o illustrate a sales proposal prepared by an intellectual property law firm for the sale of legal services to a potential client in the computer software industry. In this presentation, the use of background images, such as electrical circuitry, computers, and disks, are used to further customize the proposal to the specific type of potential client. This customization, however, does not diminish the law firm "image" which is conveyed by the overall proposal.

Figure 2:
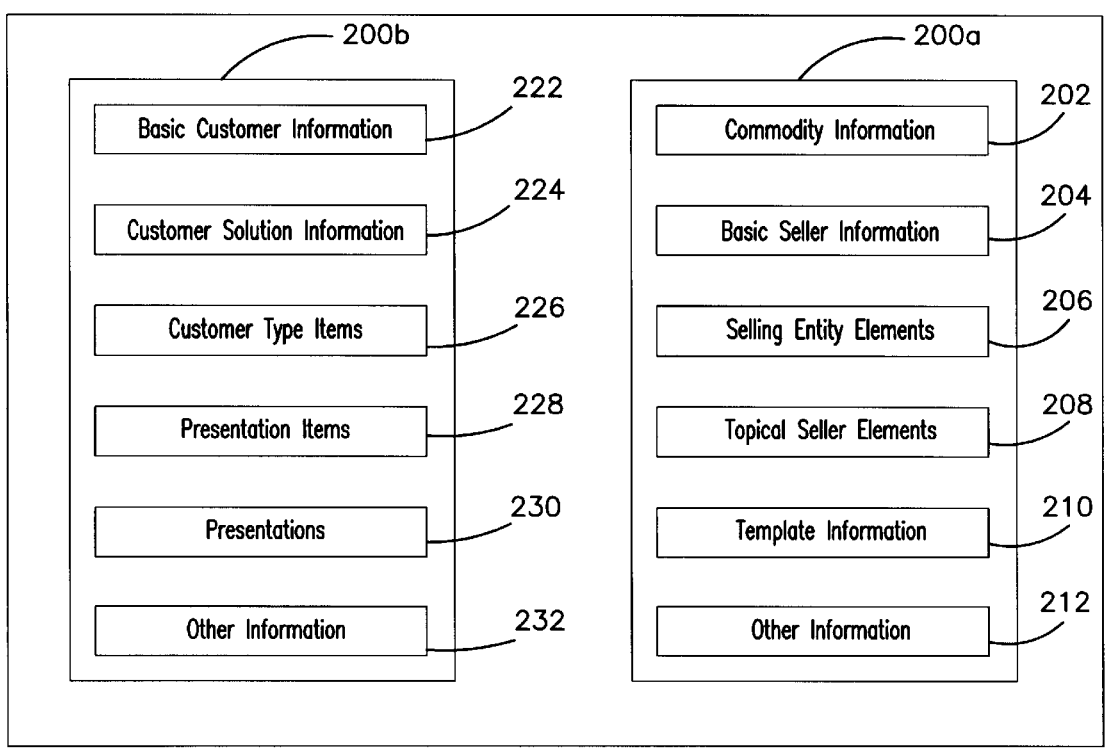
FIG. 2 is a block diagram illustrating an exemplary memory arrangement interacting with an exemplary presentation generation system according to one embodiment of the invention.

Turning now to FIG. 2, there is illustrated one embodiment of a memory arrangement 200. The memory arrangement 200 includes seller data 200a, customer data 200b, and other data, such as time, date and the like. The seller data 200a includes product information 202, selling entity elements 204, topical selling entity elements 206, template information 208, as well as other information 210. The customer data 200b includes basic customer information 222, customer solution information 224, customer type elements 226, presentation items 228, and presentations 230 which may comprise a group of presentation items, as well as other information 232. The presentation generation system 104 may access the seller data 200a and customer data 200b to generate a presentation item customized to the particular customer based on the customer solution and customer information.

The basic customer information 222 includes information concerning a customer received during the sales process, such as company name, logo(s), trademark(s), address, size, industry, budget, and other relevant information. The customer solution information 224 includes information, such as images and data, related to the particular solution which the sales representative generated for the customer. Customer solution images may include text or graphics images, such as a presentation overview or product configuration details. Customer solution data may include product prices or rates, prices or rates of competitors' products, etc. It will be appreciated that customer solution information may include, for example, specific product information selected in correspondence with the customer solution.

The customer type elements 226 may include images, such as text or articles, graphics, such as photographic illustrations, video and/or audio clips, etc. The customer type elements are related to a particular type of customer. Types of customers may include, for example, customers in the travel industry, computer industry, and automotive industry. In the example of intellectual property services, the customer type may represent the technology area, such as computer, chemical, mechanical, etc., with which the customer (client) is involved. A customer type image of a plane, hotel, or beach, may be associated with a customer in the travel industry, while a customer type image representing a picture of an assembly line or car may be associated with a customer in the automotive industry. It should be appreciated that a particular customer type element may be associated-with a number of different customer types. For example, a hotel picture may also be associated with customer types in the event planning or hotel industry in addition to the travel industry.

The product information 202 includes a variety of data related to the particular product being sold, such as product specifications, configurations, prices, etc. In the advertising industry, such data may include advertising rates, mediums, broadcast coverage, length, and demographic information of the seller, such as audience information relating to the advertisement medium, including expected income, age, and profession of the audience. In the legal services industry, such data may include attorney profiles, billing rates, etc. The product information 202 may further include product type elements, that is, elements associated with a particular type of product. For example, a product type image of rugged terrain may be associated with a four-wheel drive sports utility vehicle. The product type elements, like the other elements, may be selected based on the customer solution and integrated into a presentation item.

The selling entity elements data block 204 includes basic and particular information related to the seller. Basic selling entity elements may include images, audio data, and other information which directly convey the entity of the seller, such as the logo(s), trademark(s), pictures of particular products, names, addresses, etc. Other selling entity elements are representations having an impression characteristic which indirectly conveys the identity or "image" of the seller to a customer, without using direct conveyance means such as trademarks, logos, the seller's name, and the like. The selling entity elements having these impression characteristics may include images, templates, video clips, audio clips, etc. Certain selling entity images having impression characteristics may include articles having text of a certain font size or type identifiable with the selling entity, or graphics which incorporate pictures or illustrations identifiable with the selling entity.

The topical seller elements 206 are representations, including images, audio, etc. which relate to a particular topic, such as travel, automobiles, computers, and so forth. It should be appreciated that the topical seller elements, selling entity elements, and customer type elements may share common representations.

Each of the aforementioned elements and information are associated with one or more parameters indicative of its characteristics. As will be discussed below, these parameters are used by the presentation generation system 104 to identify appropriate representations and information for use in a presentation item output. The parameters may relate to the topic, size, acceptable size ranges, and other characteristics of the representation or information.

The template information 208 may include templates used by the presentation generation system 104 to develop a presentation item and templates used by the customer solution system 102 to receive customer information and to generate a customer solution. It should be noted that the term template as used herein is to be broadly construed. The term includes templates as commonly known as well as programs, rules, or instructions which perform the functions of the templates described herein. The template information 208 used by the customer solution system 102 may include input forms or question forms for receiving customer specific information. The template information 208 may further include templates for generating and presenting to the customer presentations, orders, quotes, and the like.

The templates used to generate customized presentation items may include presentation format templates indicating the various information to be integrated to form a presentation item. The presentation format templates may be associated with rules defining, for example, the layout of a presentation item, including the color, size and location of images, and the font for text, etc. In this respect, the template may itself comprise a selling entity element having an impression characteristic, the impression characteristic being, for example, the layout, color, fonts and font size, of a particular publication of the selling entity.

In particular, a template may define one or more locations for text and associate each text location with one or more rules setting such things as a range for the text length, and a certain type of content, e.g., topical seller information. The template may then identify appropriate text images based on these rules. A template may also define locations for graphical images and associate each graphical image with rules setting, for example, maximum or minimum graph size, graph content, graphic style, etc. Where text and graphics images are integrated in a given area, selection of certain text or graphics may be interdependent. For example, in a given area, a lengthier text location will be associated with a smaller graphic. Exemplary templates used to create presentation items are discussed in greater detail below.

Although one exemplary embodiment of the database has been disclosed in detail, those skilled in the art will appreciate that the functionality may be implemented using a variety of other database structures using many different software packages on a variety of hardware platforms. Although the database has been divided into seller data 200a and customer data 200b, those skilled in the art will appreciate that this division is primarily conceptual. The various aspects of the database may be stored on a single database and these conceptual distinctions may blur or disappear in other embodiments.

Through the use of the templates and rules, the present system 100 is able to construct a vast number of different presentation items. Some of the presentation items which the sales presentation system 100 may generate include: graphs or graphics illustrating customer solution data in a manner consistent with the visual impression characteristics of the seller, and presentation items illustrating sample product configurations in a manner consistent with the impression characteristic of the seller. Such customer solution graphs or graphics may include graphs comparing the price of seller's product or product to those of its competitors. Product configurations may include, for example, in the advertising industry, sample ads, and in a tangible goods industry, the design specifications of a particular good. For the purpose of illustrating the various aspects of the invention, there are illustrated in the following figures just a few of the many presentation items that can be generated by the present sales presentation system 100.

Figure 3:
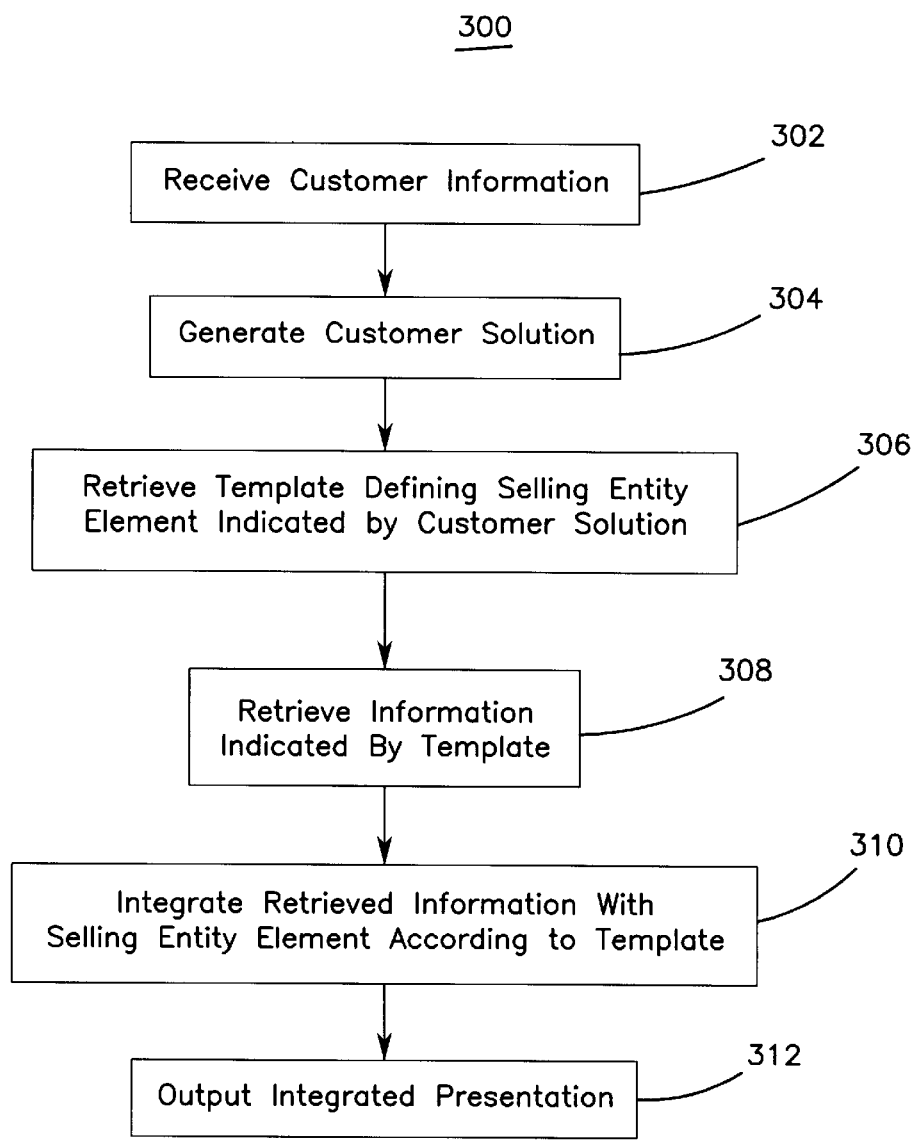
FIG. 3 is a flow chart depicting a process of a system in accordance with one embodiment of the invention.
Figure 4:
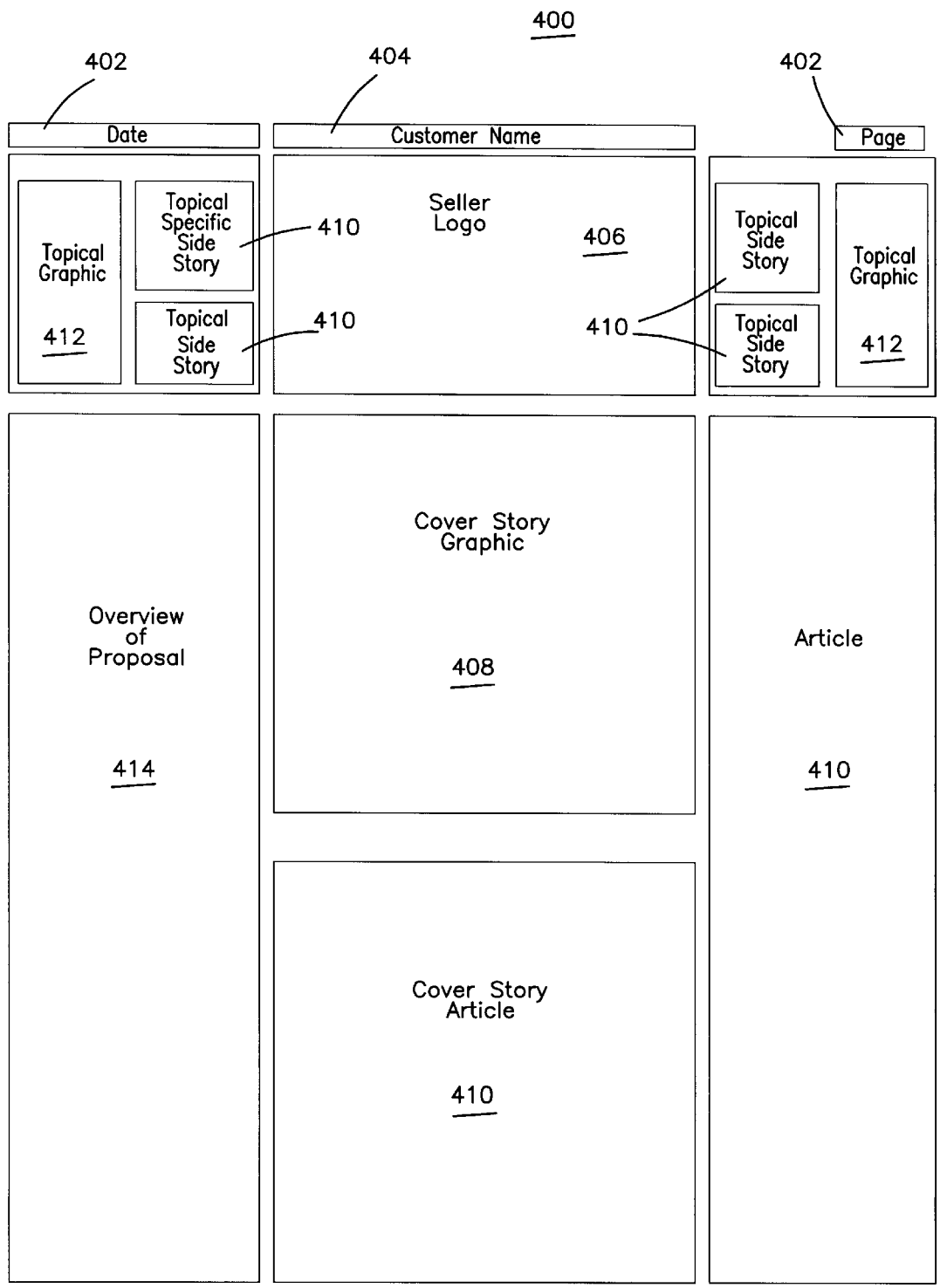
FIG. 4 depicts a template which may be used in the process of FIG. 3.
Figure 18B:
FIG. 18a–o illustrate an example proposal from USA TODAY to UNIGLOBE TRAVEL according to one embodiment of the present invention.
Figure 18D:
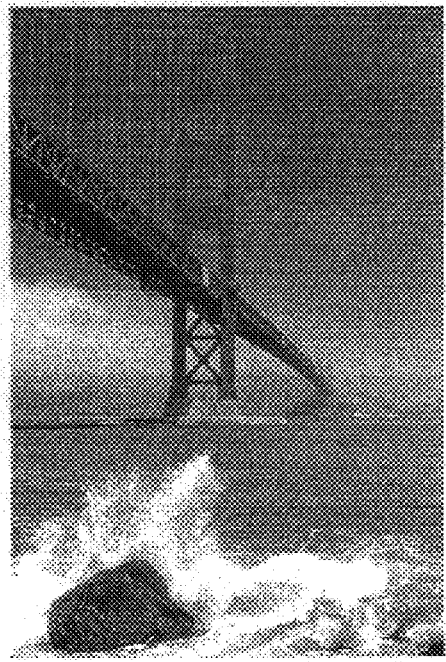
Figure 18E:
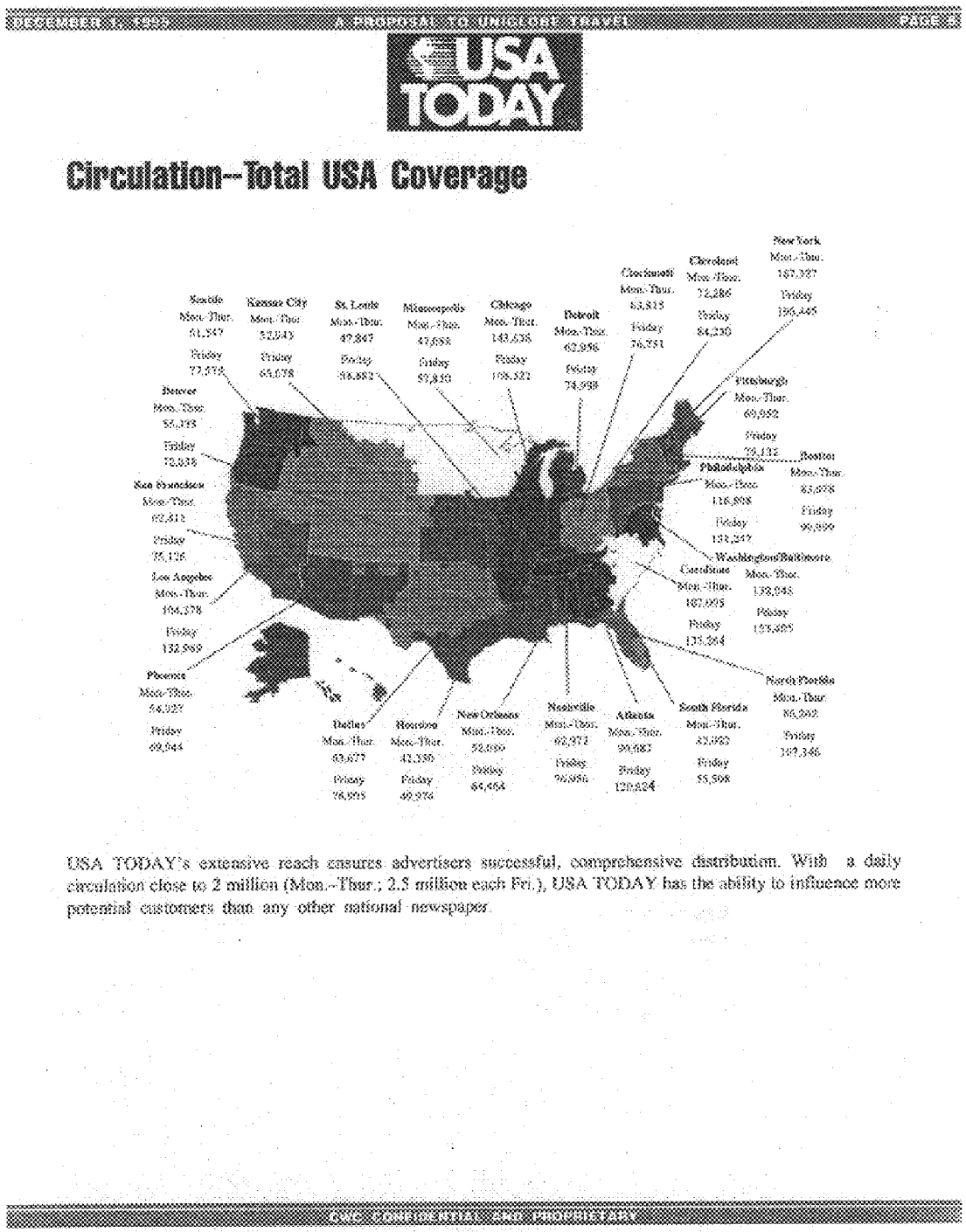
Figure 18F:
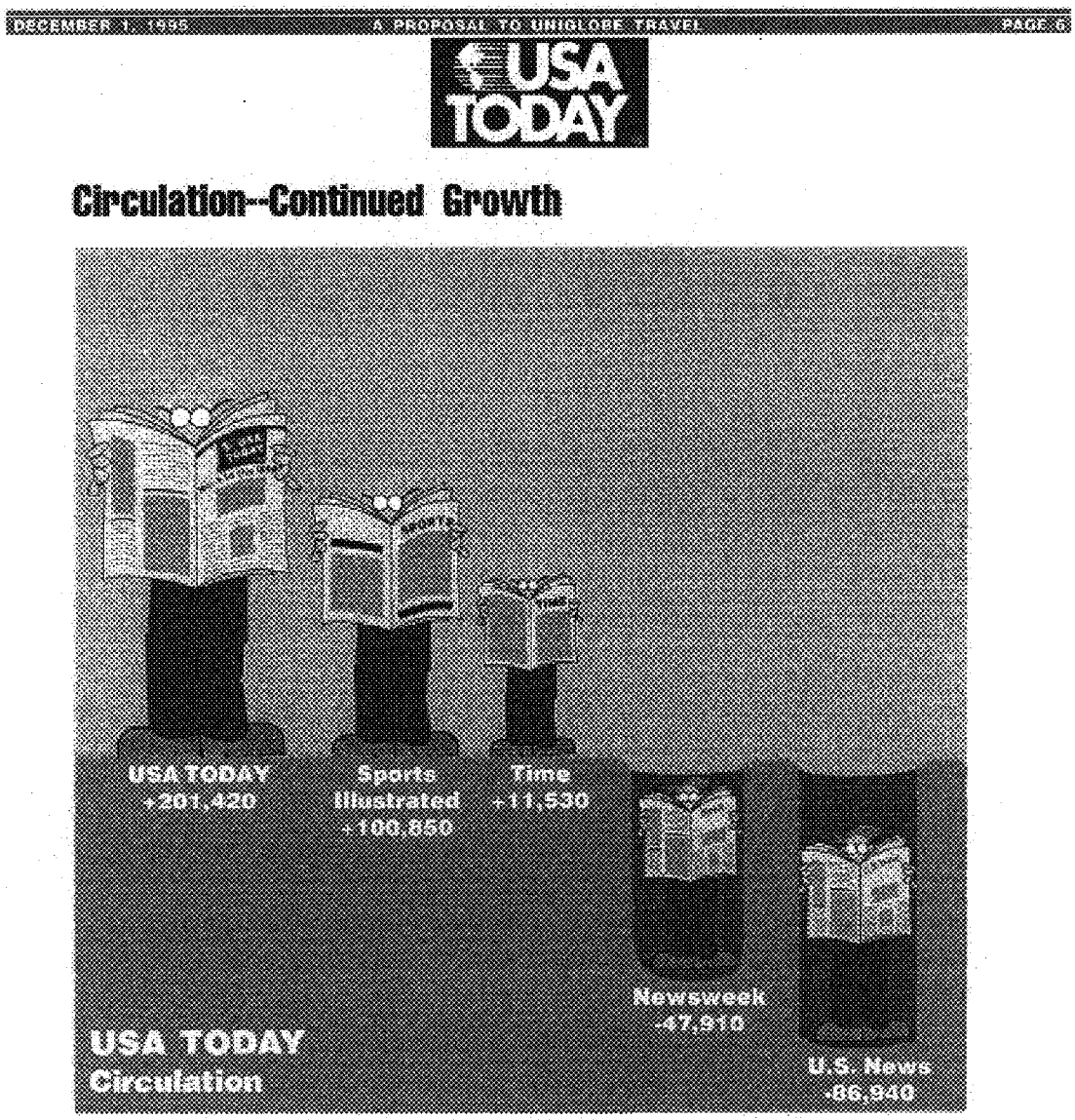
Figure 18G:
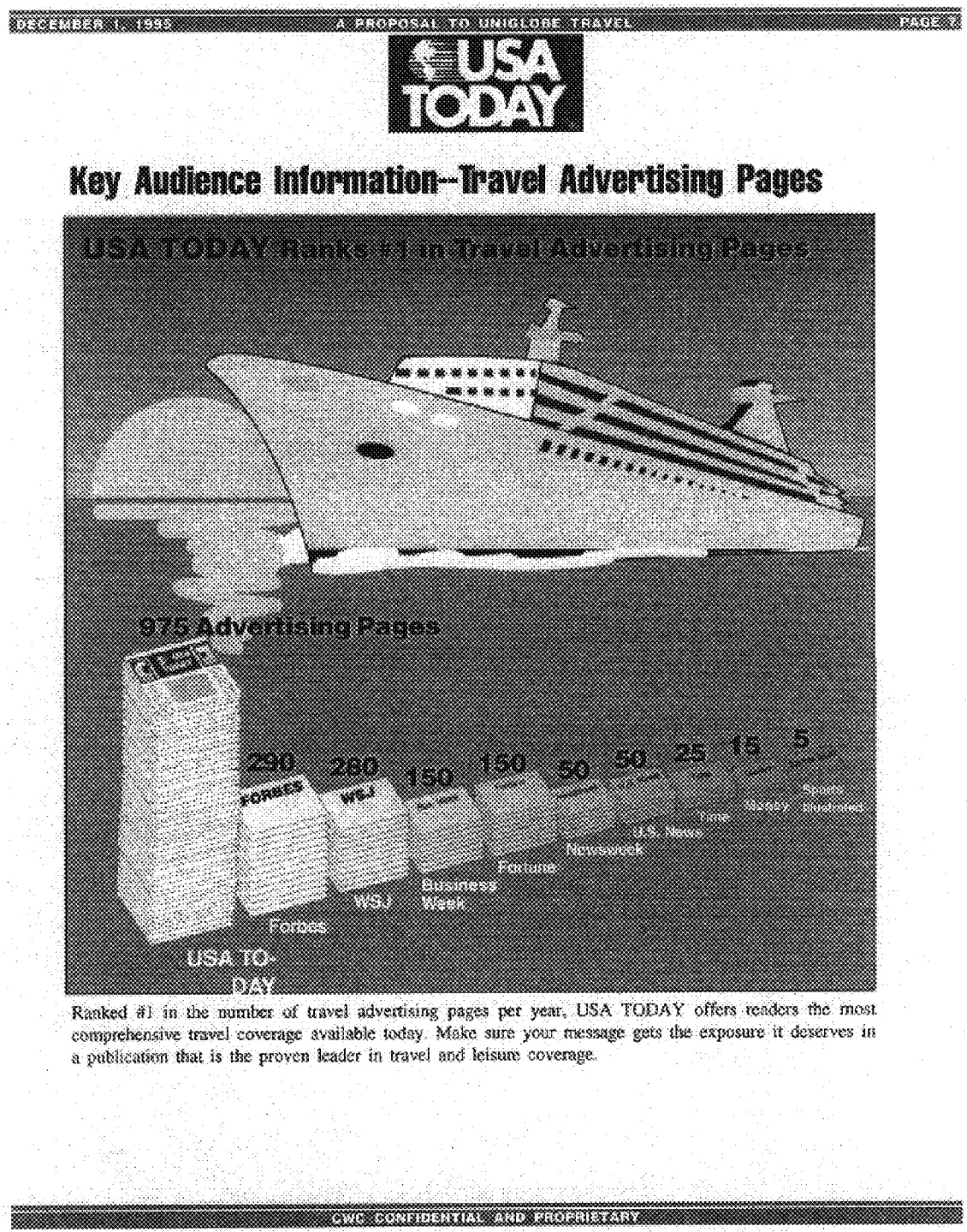
Figure 18H:
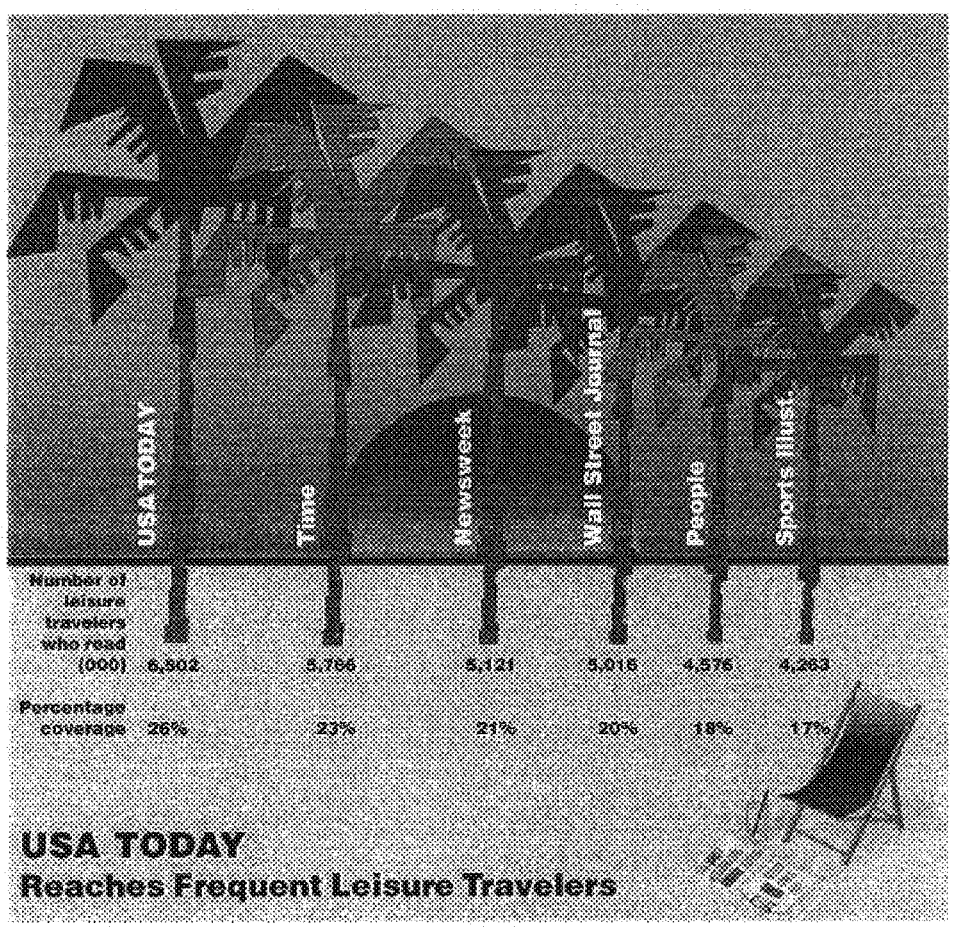
Figure 18I:
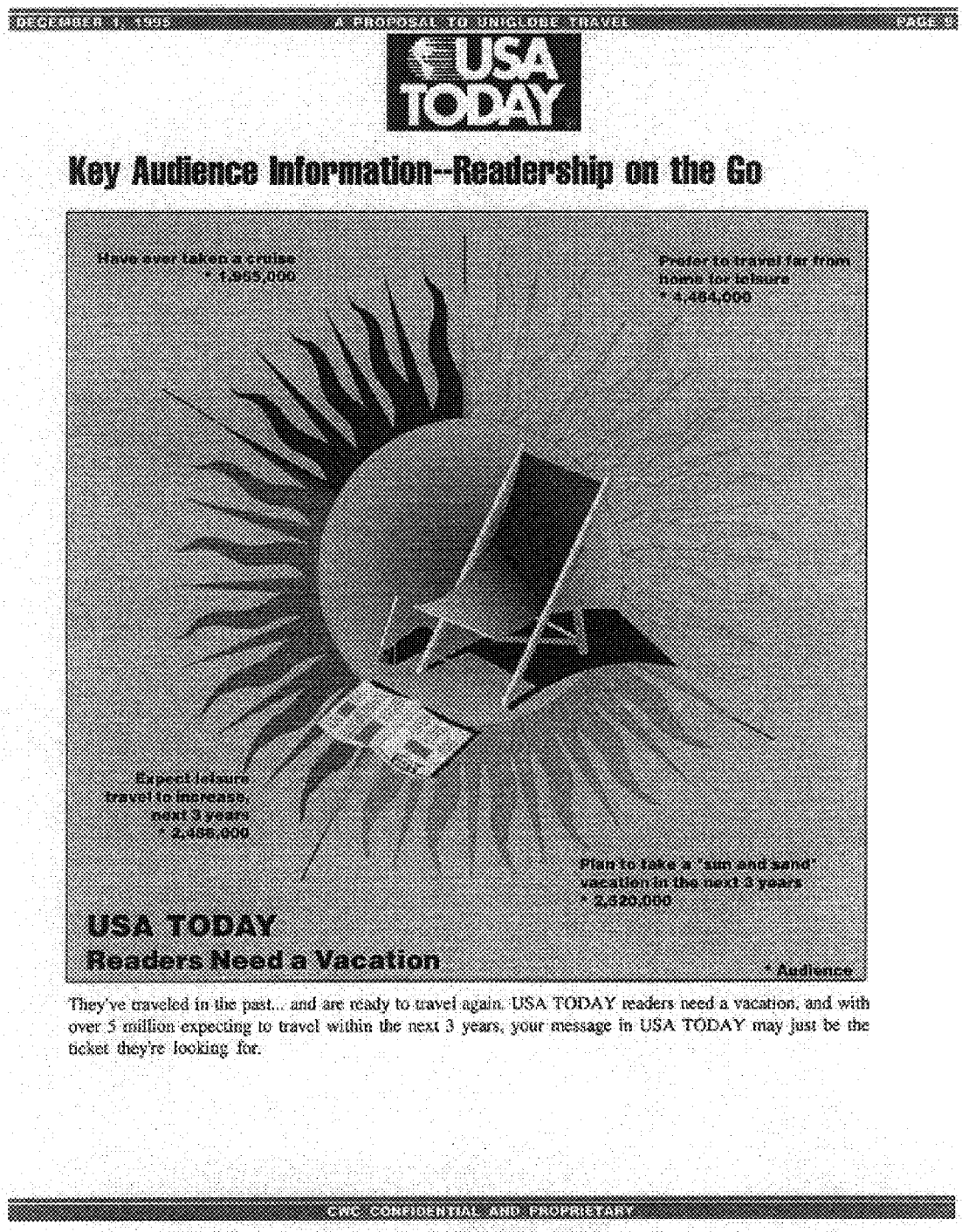
Figure 18J:
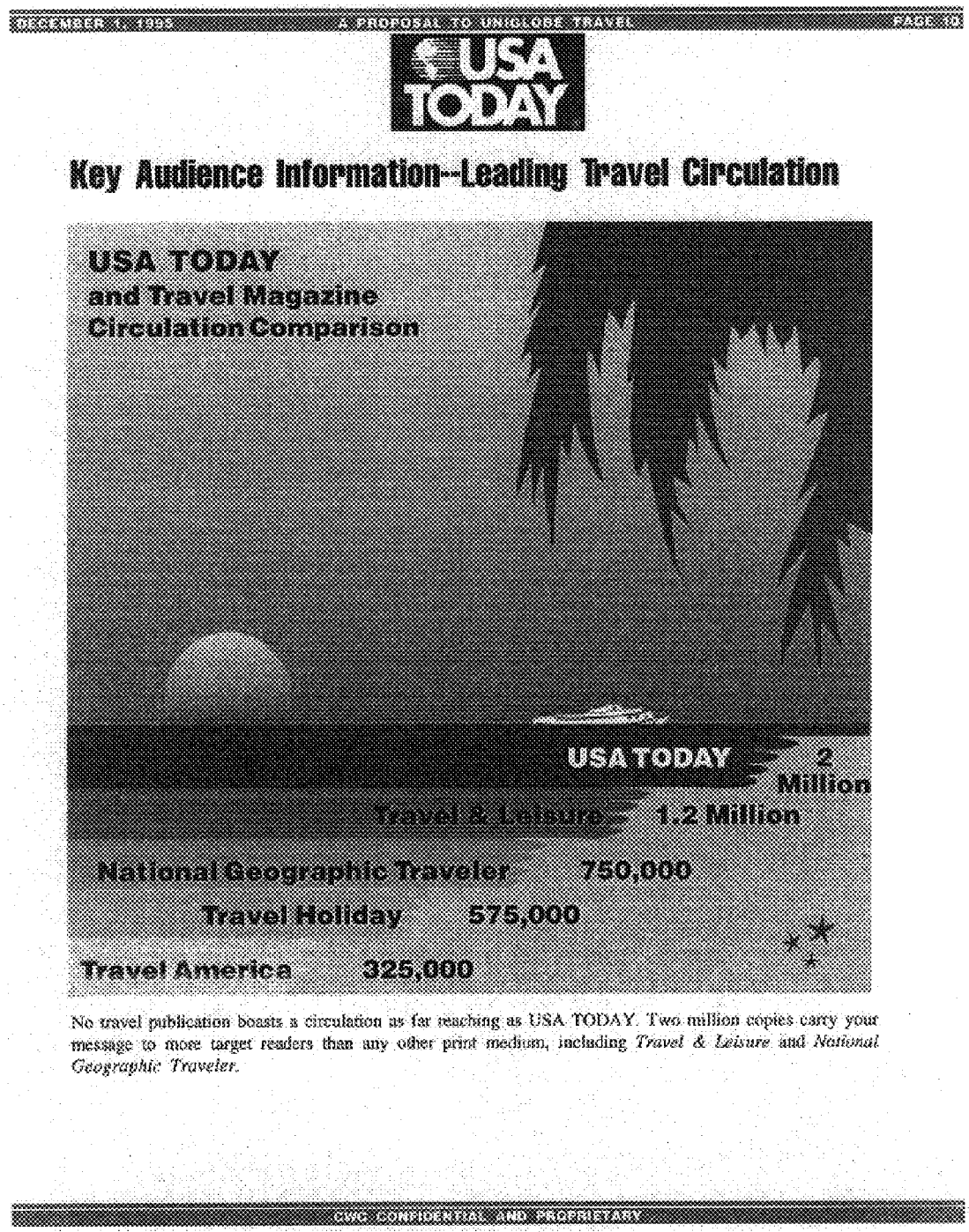
Figure 18K:
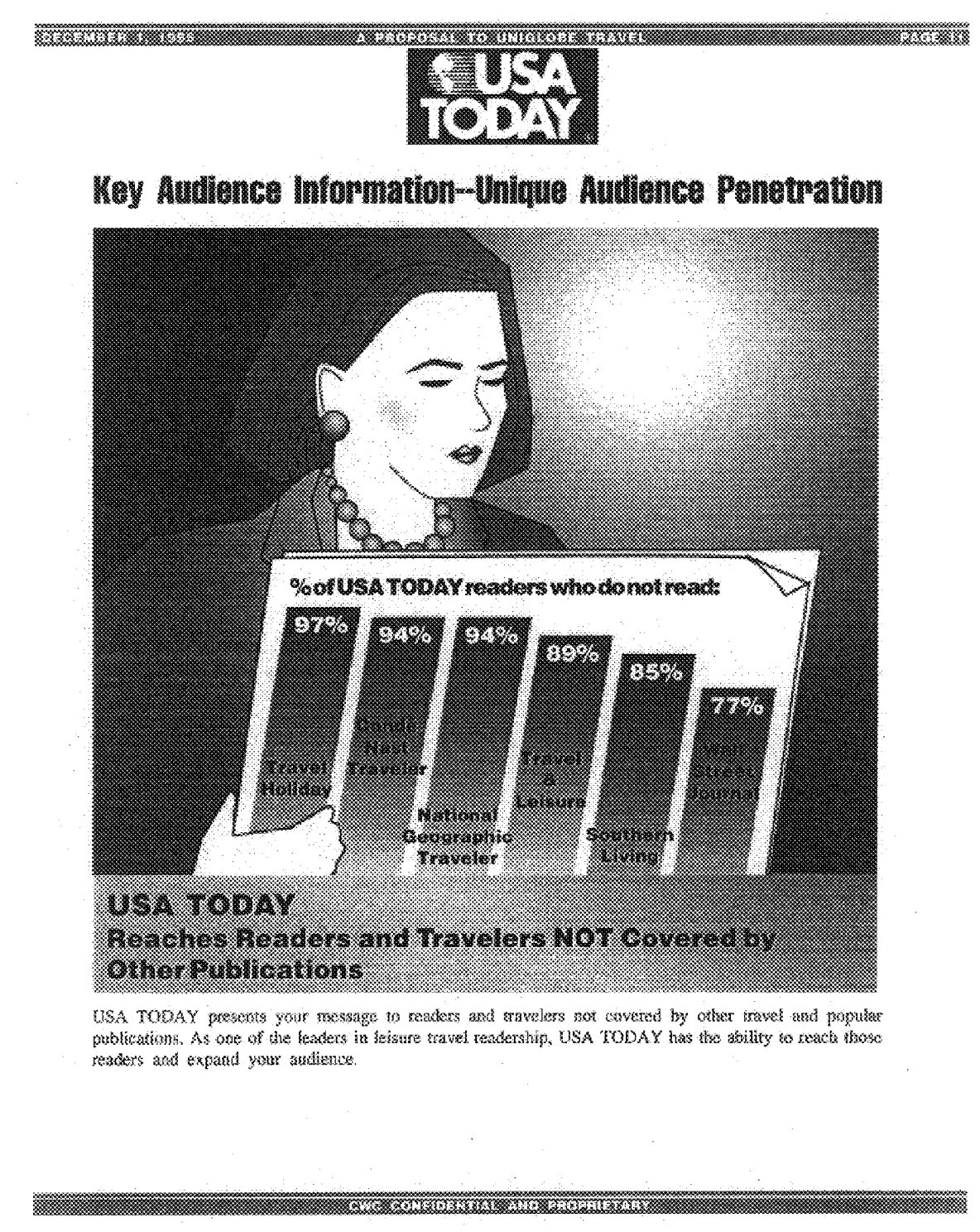
Figure 18M:
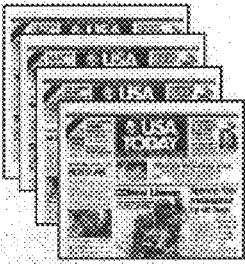
Figure 18O:
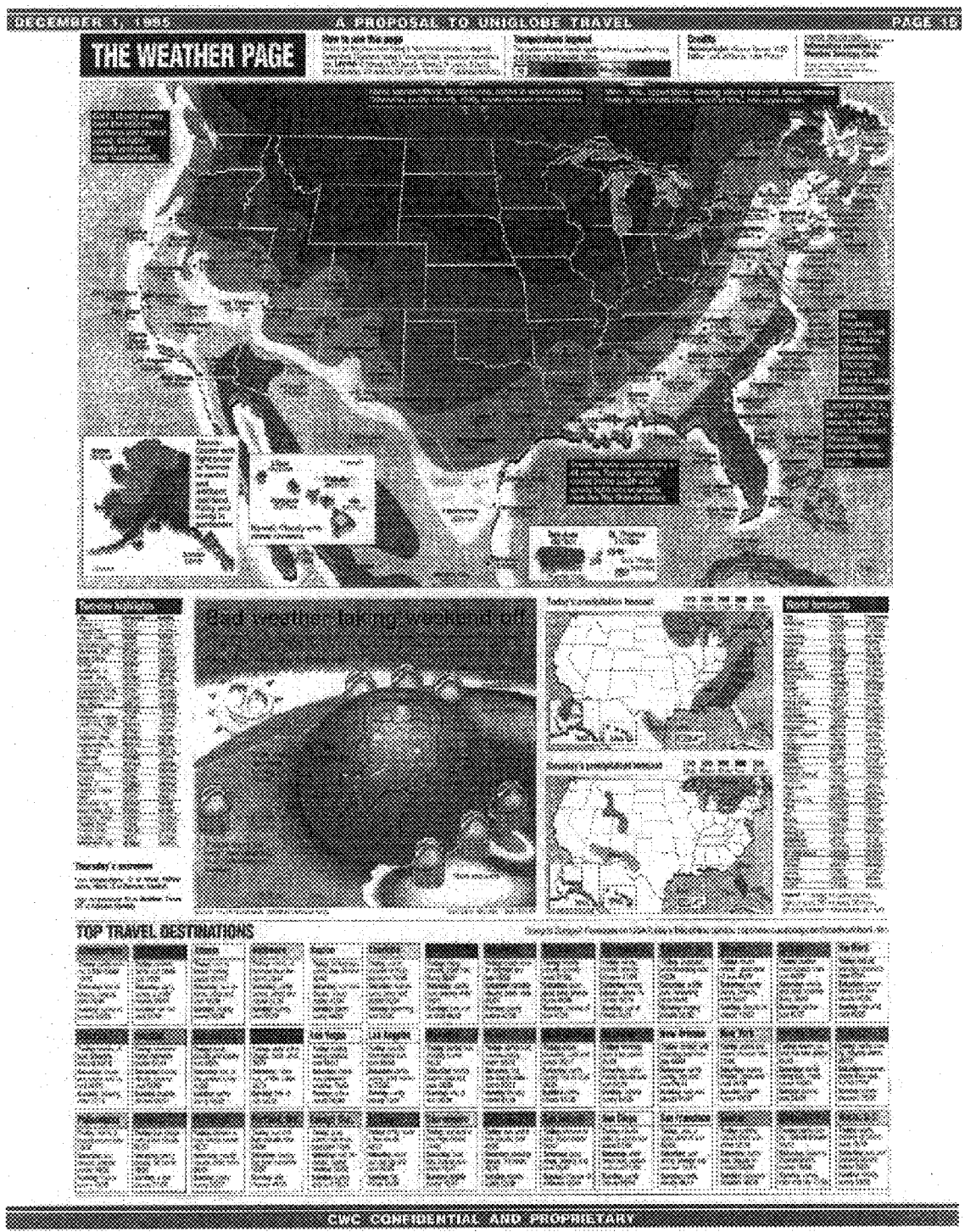

FIGS. 3–5 illustrate an exemplary use of the sales presentation system 100 in generating a customized cover page for a presentation document such as that illustrated in, FIG. 18a. In particular, FIG. 3 illustrates a flow chart which depicts the process generating a customized cover page, while FIGS. 4 and 5 illustrate respectively an exemplary template used in the cover page generation process and an exemplary cover page. Generally the process for generating a cover page includes identifying and retrieving a cover page template, having a visual impression characteristic of the selling entity, retrieving the information indicated by the template, and integrating the information according to the template to form a cover page maintaining the impression characteristic, and indirectly conveying the seller's identity and, in some instances, the customer's preferences or industry.

Referring now to FIG. 3, details of the exemplary process for generating a cover page will be described. The first two blocks, blocks 302 and 304, represent operations performed by the customer solution system 102 in receiving customer information and generating a solution. In particular, block 302 represents the customer solution system 102 receiving customer information. This step includes the sales representative or the customer inputting, for example by free-form or by answering questions, information regarding the customer and the customer's interest in the product for sale. In doing so, the customer solution system 102 may access input forms included in the template information 208 to receive the customer information into the memory arrangement 106. Block 304 represents the customer solution system 102 generating a customer solution based on the stored customer information. This step may include the sales representative interacting with the modules of the customer solution system 102 to generate a customer solution, including, for example, a recommended product configuration, price, etc.

Once the customer information has be received and a solution developed, the sales generation system 104, based on the customer solution or customer information, retrieves a template defining a cover page having an impression characteristic of the selling entity, as indicated at block 306. This step may include identifying an appropriate cover page from a plurality of cover pages, the appropriate cover page being determined based on the customer solution or customer information. For example, a cover page template representing the front page of a newspaper business section may by selected for a customer in the financial industry. As will be discussed in greater detail below, the cover page template generally defines locations associated with rules which in turn define the layout of the cover page as well as the content, size, and other characteristics of the information on the cover page.

The information to be integrated according to the template is retrieved as indicated at block 308. This information may include basic seller and customer information, such as their names or logos, customer type elements or topical seller elements, such as topical articles or pictures, and customer solution information. The customer solution information may be a customer solution specific image which contains a portion of the customer solution, for example, a textual overview of the customer solution or the proposed document.

Once the template and the information indicated thereby are identified and retrieved, the presentation generation system 104 then integrates the template with the information to form a presentation item, such as a composite image, in a manner which reinforces the visual characteristic of the selling entity. This step may include inserting the information in a particular location, size or font, including resizing or otherwise reformatting text or pictures according to the selected template. The composite image may then be automatically output or manipulated by the sales representative and output as will be described hereinbelow.

Turning now to FIGS. 4 and 5, there is illustrated an exemplary cover page template 400 (FIG. 4) that may be used to generate a cover page, such as the exemplary cover page 500 (FIG. 5). For convenience, reference may also be made to the first page of the document in FIG. 18 which illustrates in color the cover page of FIG. 5. The cover page template 400 generally includes rules that define the layout and content or topic of the images on the cover page 500 as well as the color, size, shape, and in the case of text, the text font of the cover page images. Images which then have parameters consistent with the rules for the particular locations are retrieved from the image database and inserted at the indicated location.

In particular, the cover page template 400 defines locations 402 for basic information such as presentation date and page number, a location 404 for basic customer information such as the customer's name or logo 504, and a location 406 for the basic seller information, such as the seller's name or logo 506. The template 400 also defines locations for topical seller elements or customer type images, such as locations 410 for articles 510 related to the seller and customer and locations 412 for pictures 512 related to the type of customer. The template 400 further defines a location 414 for customer solution information, for example, presentation overview text 514.

Figure 6:
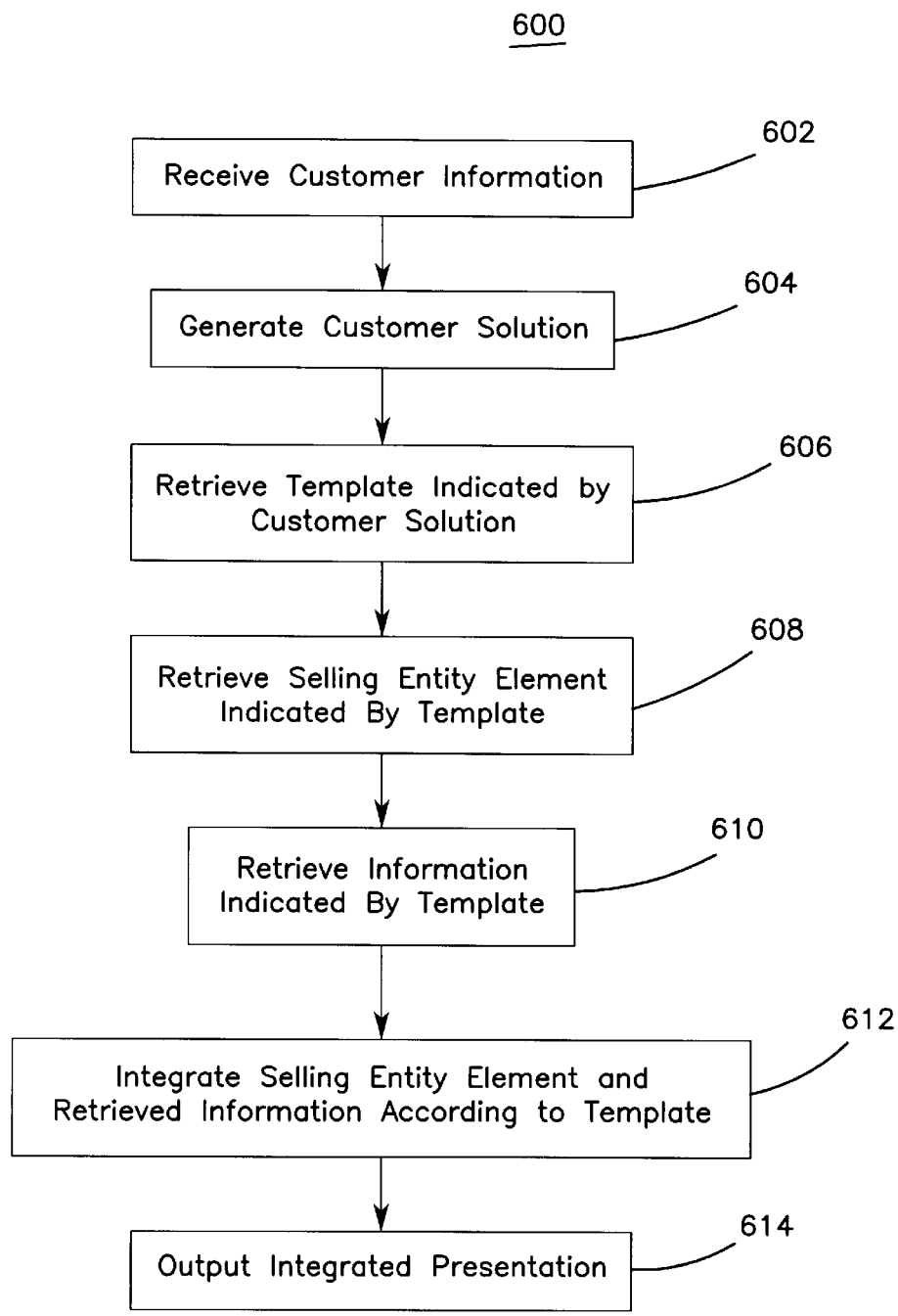
FIG. 6 is another flow chart depicting a process of a system in accordance with one embodiment of the invention.
Figure 7:
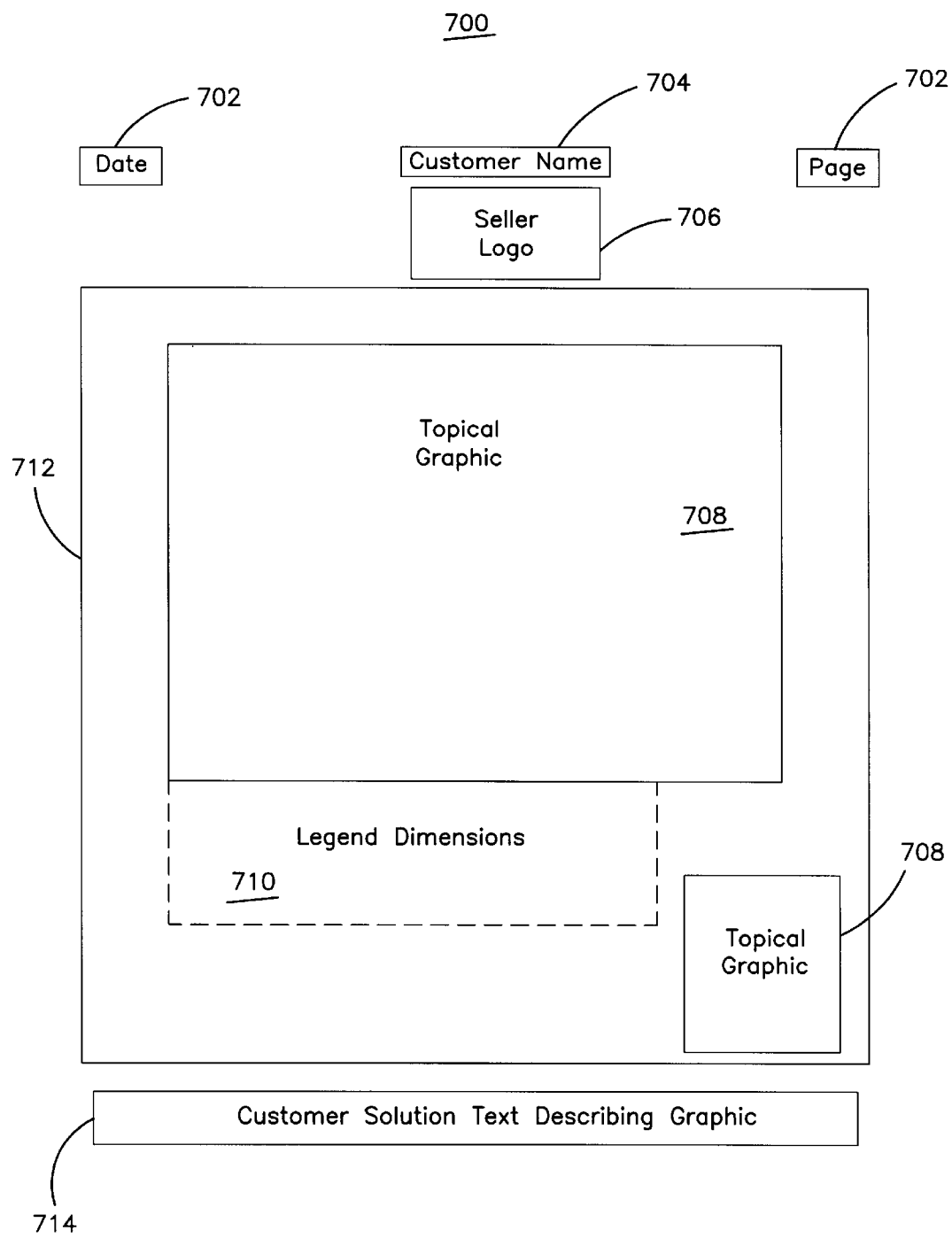
FIG. 7 depicts an example of a template which may be used in the process of FIG. 6.
Figure 8:
FIG. 8 illustrates an example presentation output constructed using the template of FIG. 7.

Turning now to FIGS. 6–8, there is illustrated respectively an exemplary process for generating a presentation item containing a customized graph, a template for use in the graph generation process, and an exemplary presentation item graph. Again, for convenience, reference may be made to FIG. 18g.

FIG. 6 in particular illustrates a flow chart which depicts an exemplary customized graph generation process. Generally the flow chart illustrates the integration of customer solution information and other information into a selling entity image element having an visual impression characteristic identifiable with the selling entity to generate a presentation graph which presents the customer solution information in a manner which reinforces the impression characteristic of the selling entity element. In this manner, the sales presentation system 100 may generate numerous customer solutions specific graphs which indirectly convey the identity of the seller, including graphs illustrating competitive comparison data or audience information.

In a similar manner as discussed above with respect to FIG. 3, block 602 represents the customer solution system 102 receiving customer information and block 604 represents the sales presentation system generating a customer solution based on the stored customer information.

Once the customer information has be received and a solution developed, the presentation generation system 104 retrieves a template which defines rules for generating a presentation graph, as indicated at block 606. This step includes the system 100 identifying an appropriate template for displaying the customer solution information in a graphical format, since different type of customer solution information may be represented more effectively in different graphical formats or styles.

Operating under the rules associated with retrieved template, the presentation generation system 104 next retrieves a selling entity image having a visual impression characteristic, as indicated at block 608. The retrieved selling entity image may be indicated by the retrieved template or may be part of the template itself. The retrieved selling entity image may further be identified based on the customer solution information and/or the customer information. For example, if the customer is in the travel industry, a selling entity image depicting palm trees may be selected, since palm trees may be associated with travel. The visual impression given by the palm tree graphic illustrated in FIG. 8, further indirectly reinforces the identity of USA Today (TM). The presentation generation system 104 then retrieves the information to be integrated according to the template, as shown at block 610. This information includes the customer solution information to be illustrated in the graphs as well as other information, such as logos, date, etc.

Figure 9:
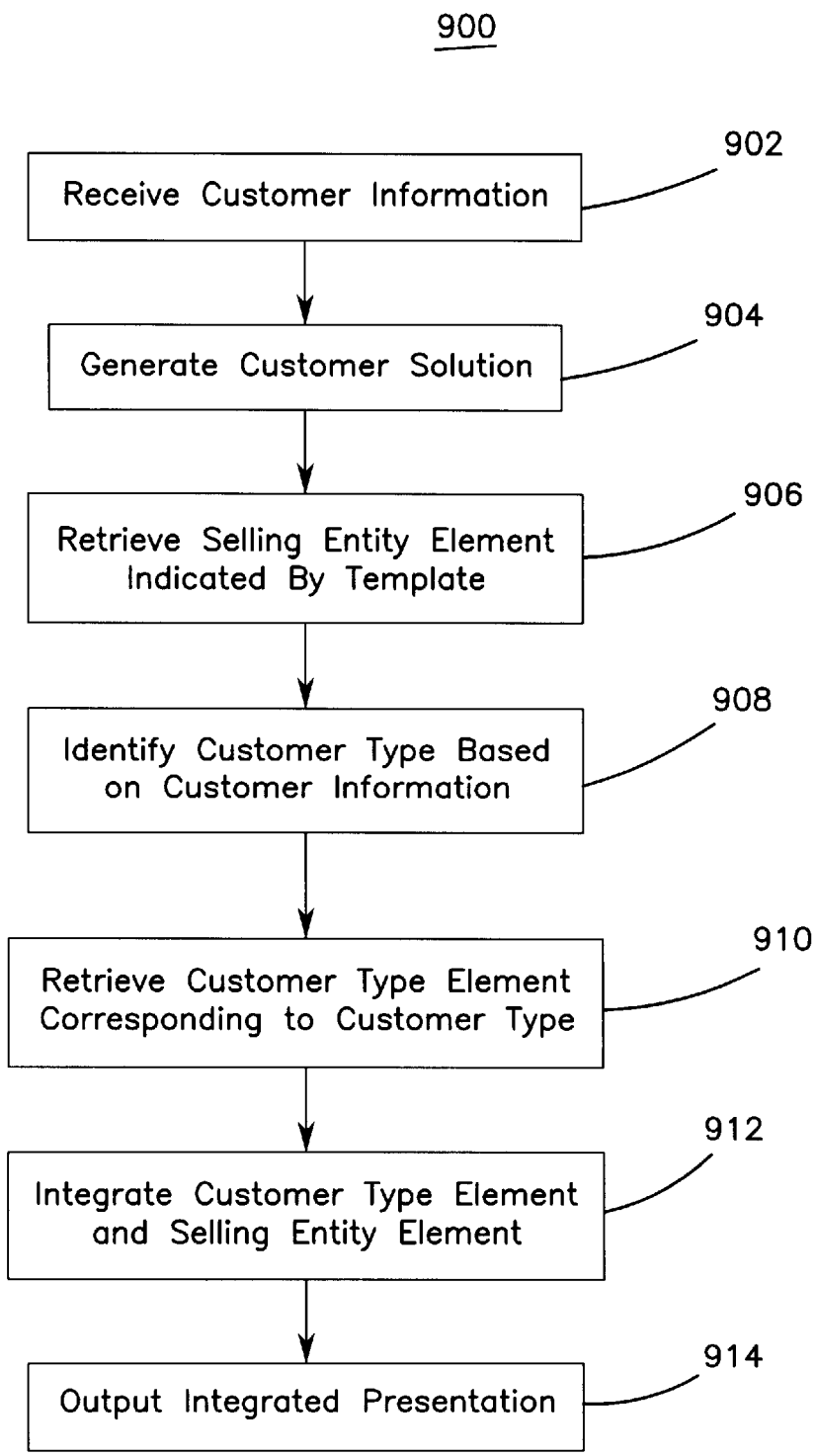
FIG. 9 is another flow chart depicting a process of a system in accordance with one embodiment of the invention.

Once the selling entity image and customer solution information and other information are identified and retrieved, the presentation generation system 104 then integrates the information with the image to form a composite image in a manner which reinforces the visual characteristic of the selling entity. For example, as shown in FIG. 9, this step may include using customer solution data to define the size of the graph and integrating customer solution text into the legend of the graph and as a description of the graph. Following the integration, the integrated image may be output and, for example, used by the sales representative to develop a final presentation document, as indicated at block 614.

FIGS. 7 and 8 illustrate an exemplary template 700 used for developing an audience information graph page 800. Again, reference may be made to FIG. 18g which illustrates the graph page 800. The template 700 defines the various locations for the layout of the page 800. In particular, the audience information page template 700 defines basic locations 702 for information such as presentation date and page number, a location 704 for basic customer information such as the customer's name or logo 804, and a location 706 for basic seller information, such as the seller's logo or name 806. The template 700 further defines a graphics area 712 which may include a graphics image location 708 for a topical seller graphic 808 and a textual image location 710 for data or text 810 relating to the customer solution information. The template 700 may also define a text location 714 for text 814 describing the graph. As shown in the exemplary page 800, the topical graph (showing palm trees as an indication of a travel topic consistent with the style used in the USA Today (TM) newspaper is integrated with customer solution information, such as the number of leisure travelers who read the illustrated publications, under rules which display the size of the graph based on the customer solution information, such as, the number of readers.

Turning now to FIG. 9, there is shown a flow chart illustrating one use of the sales presentation system 100 in generating customized proposals for use by a sales representative of a selling entity to facilitate a sale of a product offered for sale by the selling entity to different types of customers. The sales presentation system 100 may thus be used to sell one product, such as legal services, to a variety of customer types, such as biotechnology companies or computer companies, etc.

As discussed above, the customer solution system 104 first receives and stores customer information and then generates a customer solution, as indicated at blocks 902 and 904. Once the solution is generated, a selling entity element is retrieved, as indicated at block 906. This step may include identifying a template based on. the customer solution and retrieving a selling entity element indicated by the template. The selling entity element may be one which directly or indirectly conveys the identity of the selling entity.

As indicated at block 908, based on the customer information, the presentation generation system 104 identifies a customer type. For example, a customer for legal services may be identified as a biotechnology or computer company based on the customer information received during the sales process. Once a customer type is determined, a customer type element, such as an image, is identified and retrieved, as indicated at block 910. This step may include identifying a group of customer type elements indicated as being usable by the rules of the retrieved template and then retrieving from this group a customer type element which corresponds to the determined customer type. Alternatively, a group of customer type elements corresponding the customer type may be identified and then from this group, a customer type elements capable of being used in the retrieved template may be identified.

The customer type element and the selling entity element may then be integrated into a customized presentation item according to the rules of the selected template, and appropriately output, as indicated at blocks 912 and 914. A discussion of an exemplary process of outputting the presentation item will be discussed below with reference to FIG. 14.

Figure 10:
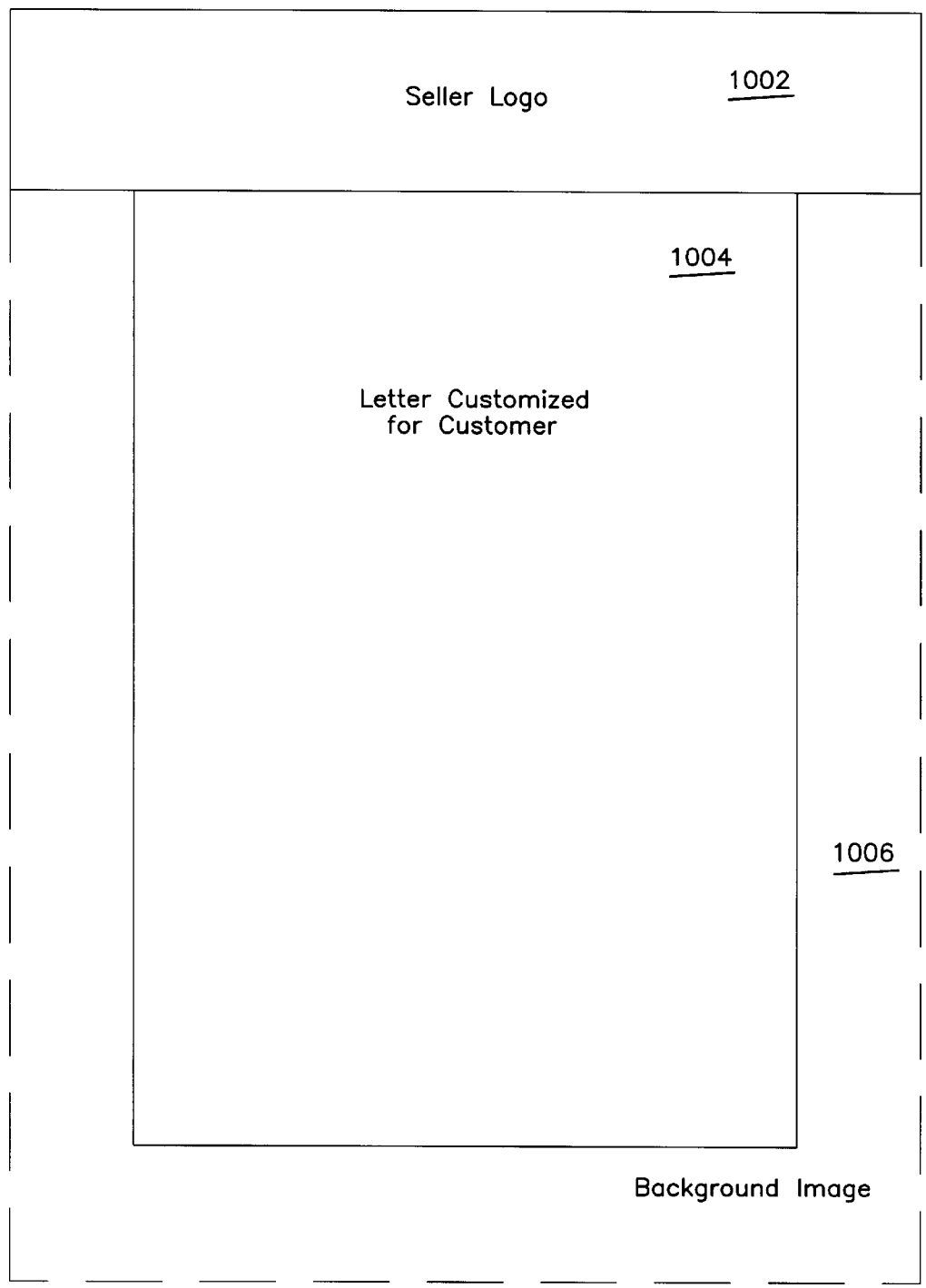
FIG. 10 is an example template which may be used in the process of FIG. 9.
Figure 11:
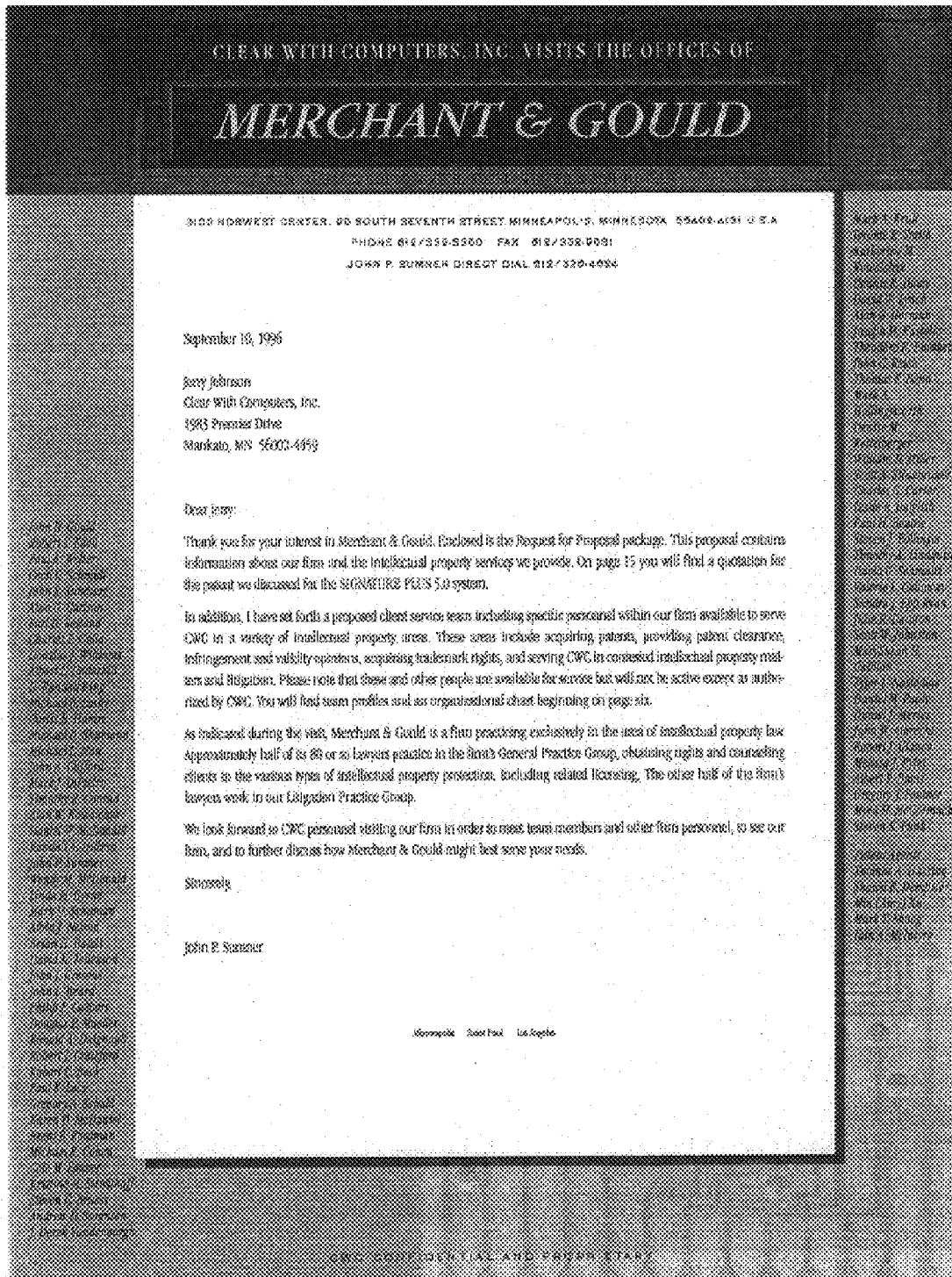
FIG. 11 is an example presentation output constructed using the template of FIG. 10.

FIGS. 10–13 illustrate exemplary templates and resulting presentation pages for use in selling legal services. Reference may again be made to FIG. 19B which illustrates in color a final presentation document for legal services, pages of which are reproduced as FIGS. 11 and 13. Referring to FIGS. 10 and 11, there is illustrated a template 1000 for generating an introduction page 1100. The template 1000 defines a location 1002 for a seller's logo or name 1102, a location 1004 for a letter image 1104 describing the customer solution, and a location 1006 for a customer type element, that is, customer type image 1106. In the illustrated embodiment, the customer type has been identified as an computer industry company and a customer type image 1006 illustrating logic circuitry has been retrieved and inserted into the introduction page 1100 at location 1006.

Figure 12:
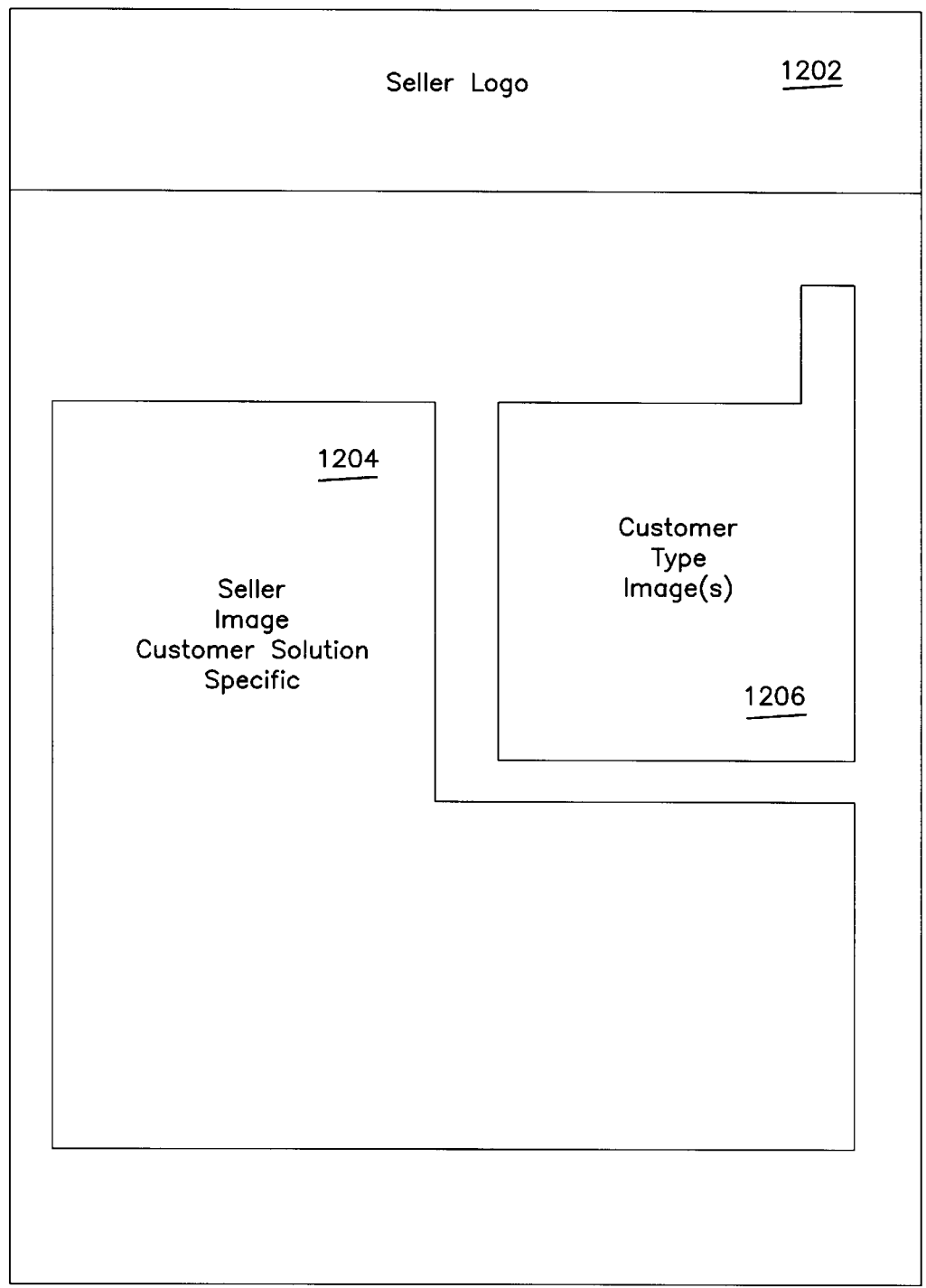
FIG. 12 is another example template which may be used in the process of FIG. 9.
Figure 13:
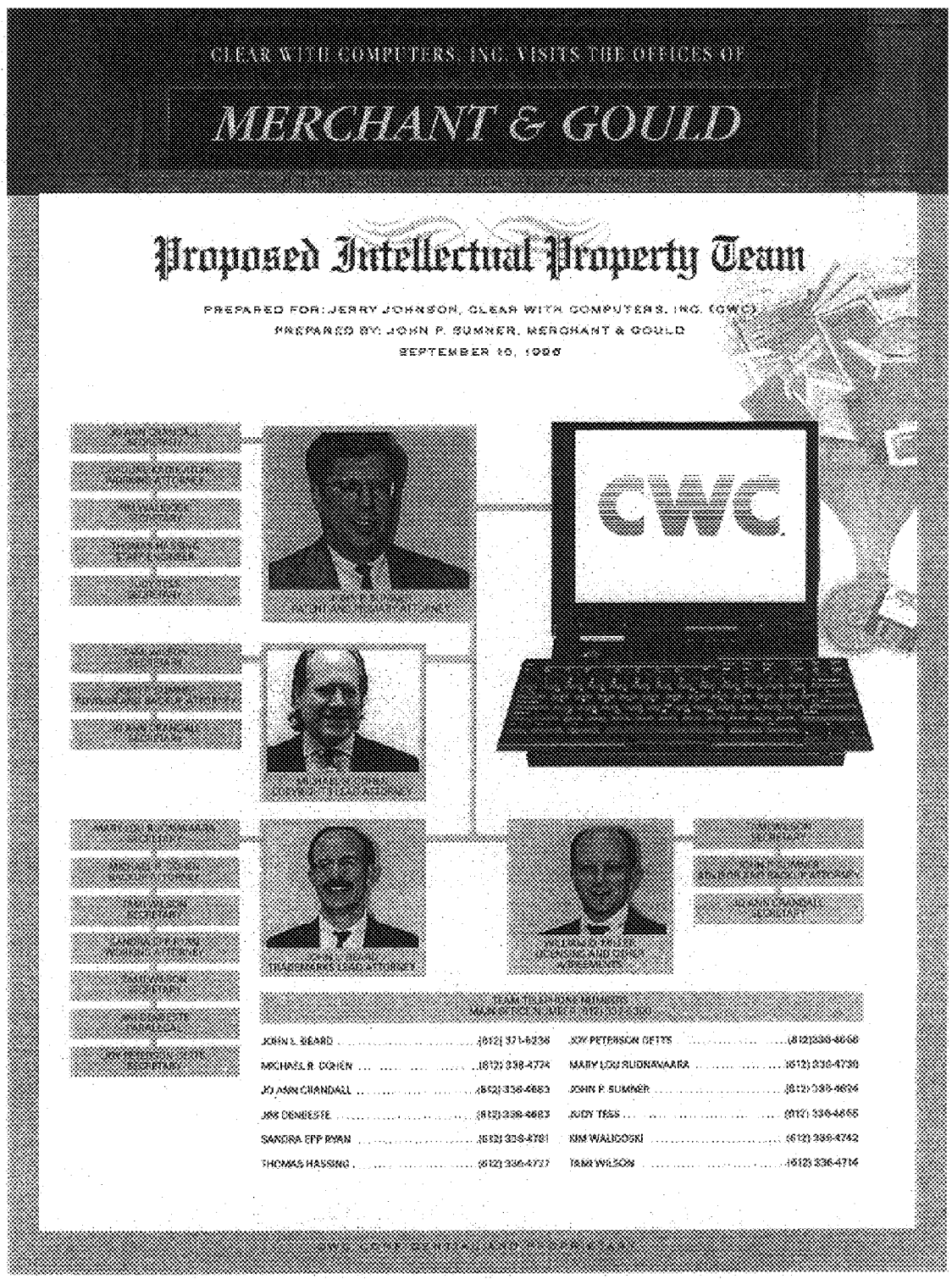
FIG. 13 is an example presentation output constructed using the template of FIG. 12.

FIGS. 12 and 13 illustrate an exemplary template 1200 for generating an customer team page 1300. The template 1200 defines a location 1202 for a seller's logo or name 1302, a location 1204 for customer solution information, such as team member profiles 1304, and locations 1206 for customer type images. In the illustrated embodiment, the customer type has been identified as an computer industry company and a customer type image illustrating a computer and disks 1306 has been retrieved and inserted into the customer team page 1300 at location 1206.

The aforementioned exemplary presentation items as well as other presentation items may be generated as necessary to depict the customer solution. After a group of presentation items are generated, a presentation illustrating the customer solution in a manner which reinforces the identity of the selling entity may be prepared and output. As mentioned above, the system may automatically prepare a customized presentation and provide it to the user or the sales representative may select certain presentation items from the group to develop a customized presentation. Automatic presentation preparation is particularly useful in the Internet environment while user directed presentation preparation more suited for in-person sales environments.

Figure 14:
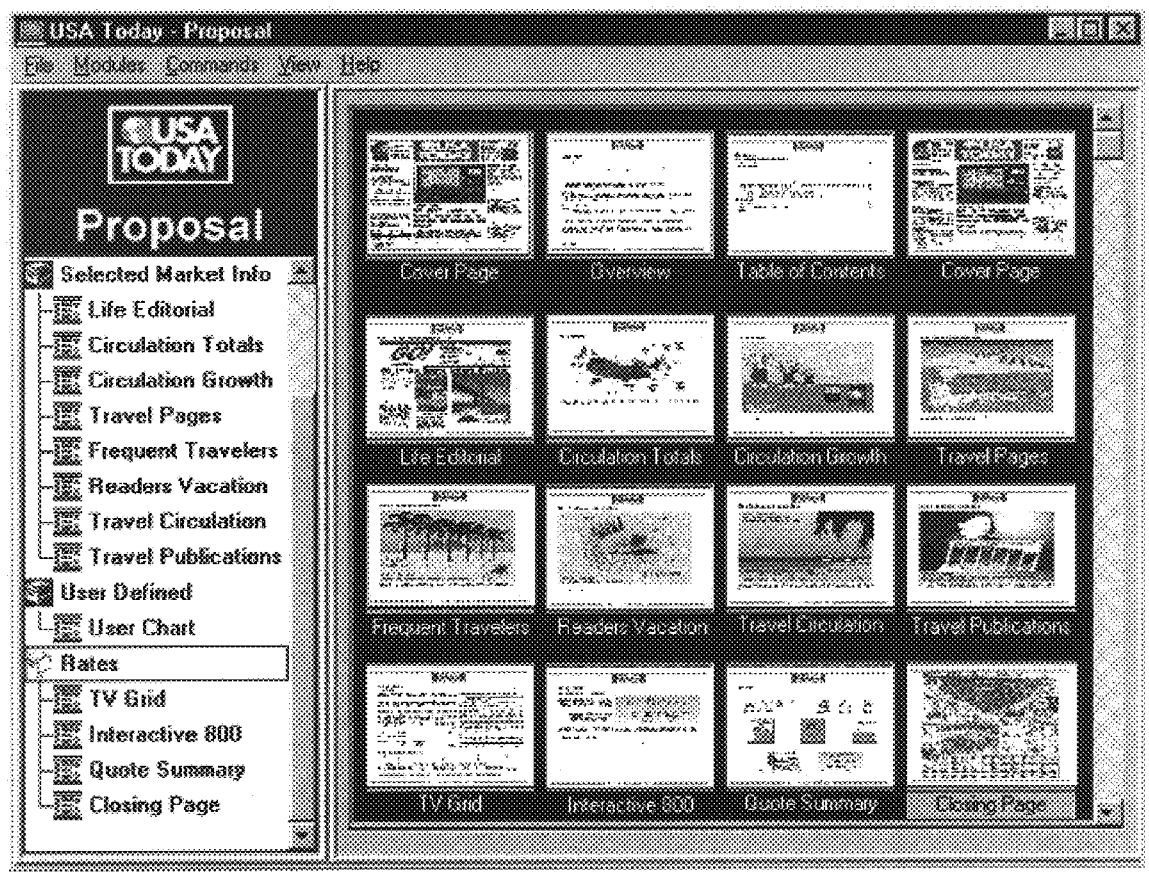
FIG. 14 is a user interface screen illustrating one embodiment of a presentation construction tool in accordance with one embodiment of the invention.

To assist the sales representative in developing a presentation document, a presentation document tool 1400 may provided. The presentation document tool 1400 may display a list of the presentation items as shown in FIG. 14. The underlying program functionality of the presentation document tool 1400 may generate the list of presentation items by traversing a decision tree. As will be appreciated by those skilled in the art, the presentation document tool 1400 may traverse the decision tree by accessing a sequence of nodes. The nodes include presentation items. The presentation document tool 1400 proceeds from the nodes by selecting all branches which satisfy a seller's customer solution. Those skilled in the art will appreciate that this type of decision tree may be implemented using various programming techniques and languages. In addition, the functionality of this logic may be implemented using other programming structures such as a decision matrix which uses multi-dimensional arrays to map presentation items to customer solution information.

After generating the list of presentation items, the presentation document tool 1400 displays the list in a suggestion window 1402 in FIG. 14. A user may select any of the presentation items they feel meet their presentation objectives. The selected presentation items are then pasted to the presentation document window 1404 to visually depict the final layout of the presentation document. The presentation document may then be output for the customer.

Figure 15:
Figure 17:
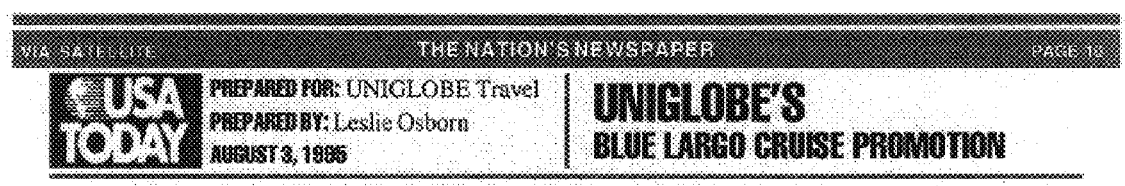
Figure 20A:
FIG. 20a–n illustrate an example proposal from USA TODAY to UNIGLOBE TRAVEL according to yet another embodiment of the present invention.
Figure 20G:
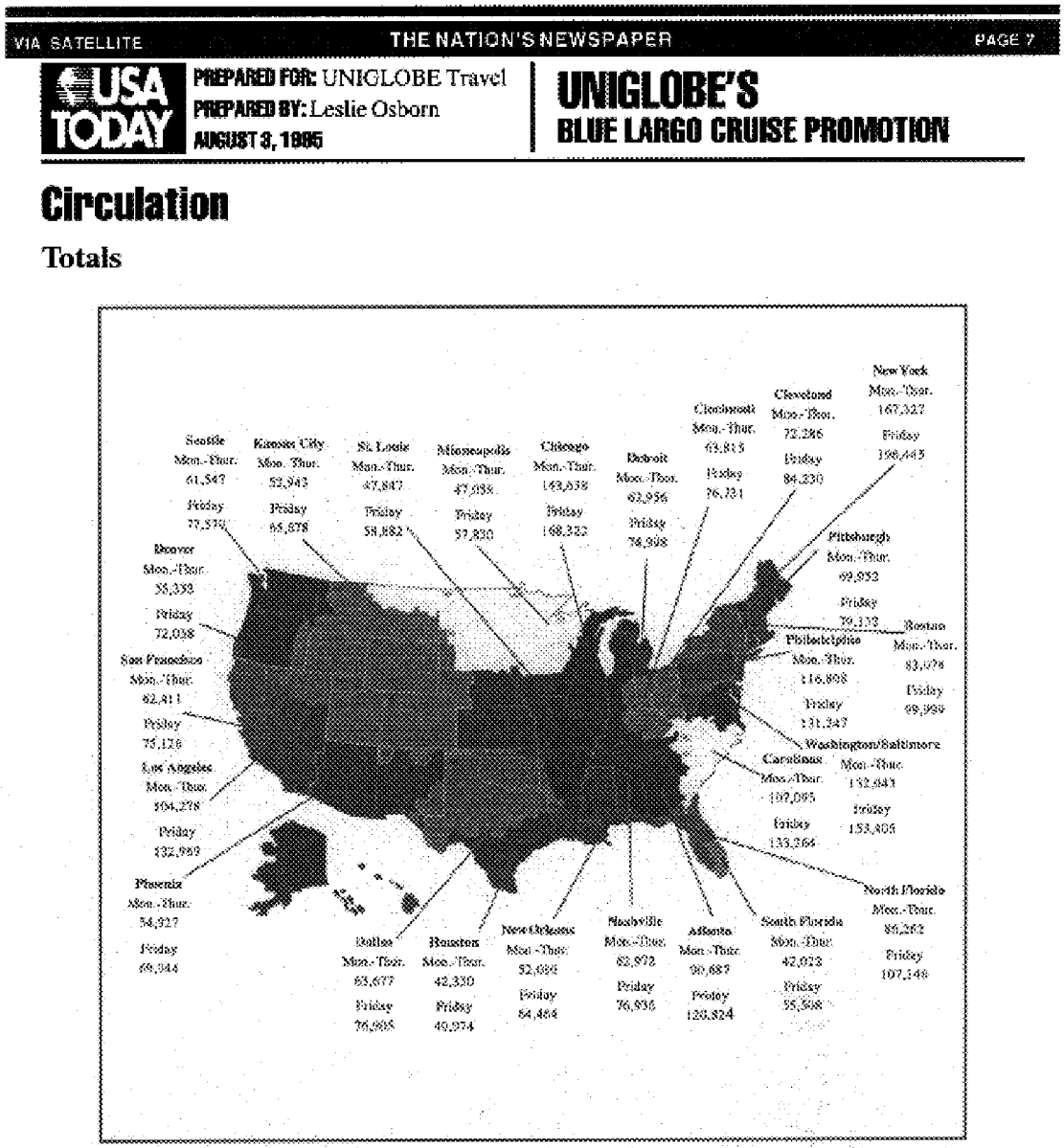
Figure 20H:
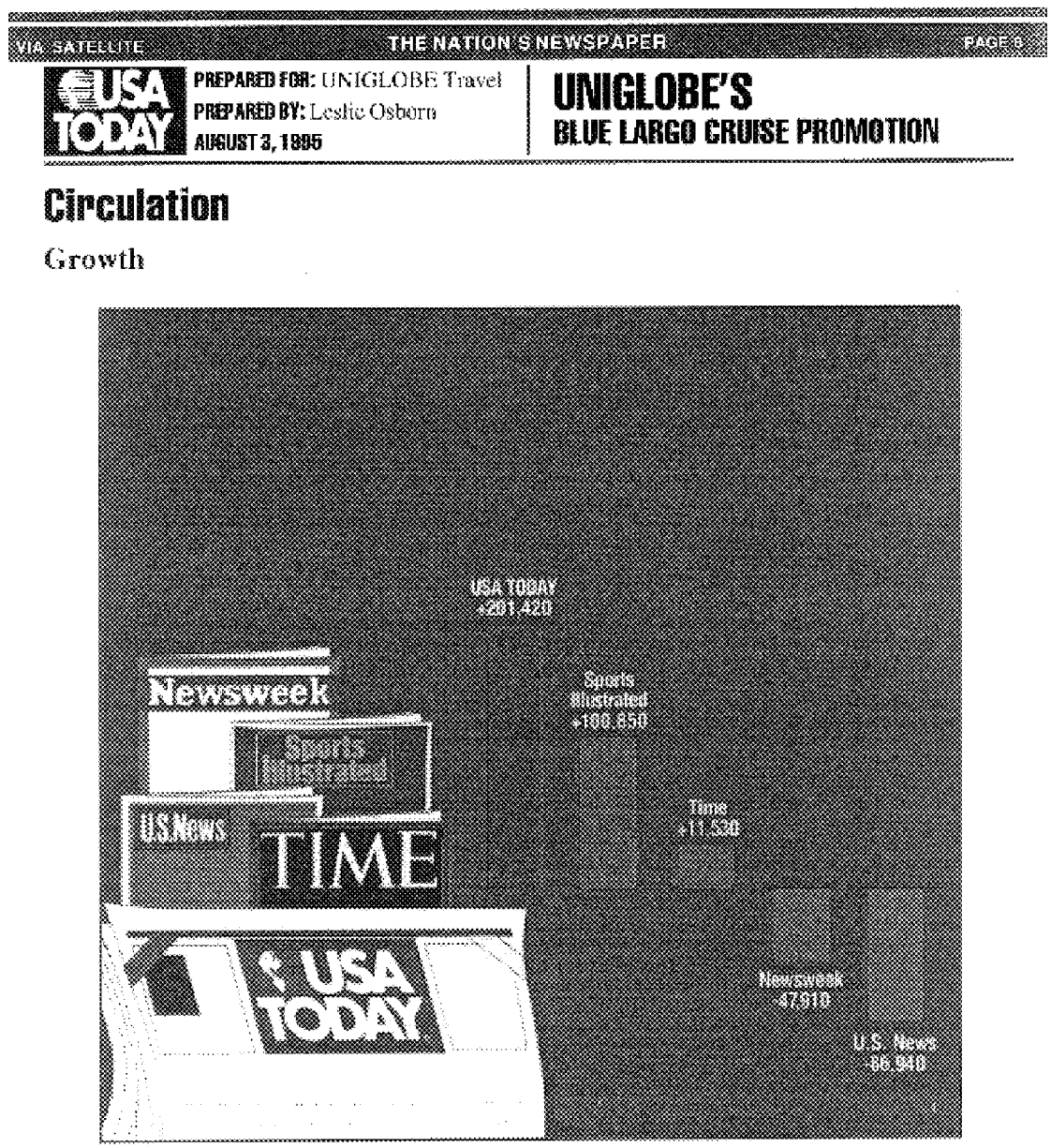
Figure 20I:
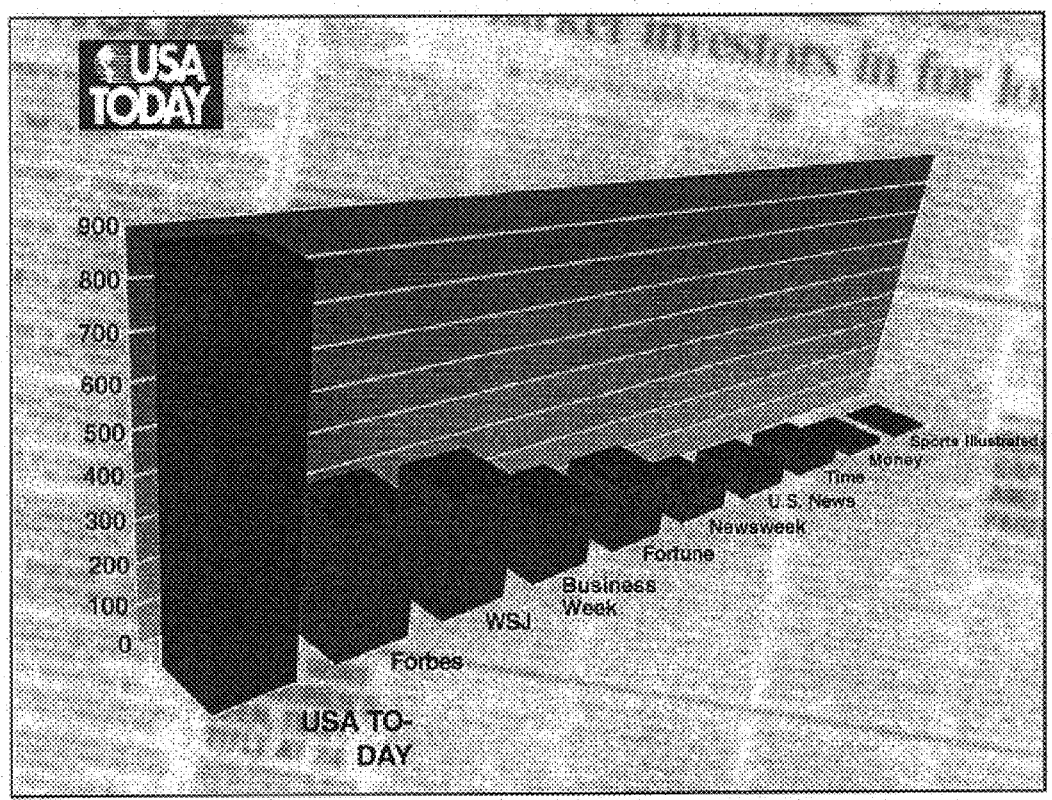
Figure 20N:

As indicated earlier, exemplary final presentation documents are included herein at FIGS. 18 and 19. For comparison purposes, there is provided in FIGS. 20a–n a sales presentation document which includes the information of FIG. 18 but which does not use the impression characteristics described above. FIGS. 15–17 also illustrate some of the pages of the sales presentation document of appendix C. As is readily apparent from a comparison of FIG. 18 and FIG. 20 (and FIGS. 15–17 and 5 and 8), the presentation document of FIG. 20 customizable, does not convey the customer information in a manner which indirectly reinforces the identity of USA Today (TM) and maintains the "corporate image" of USA Today (TM).

The foregoing description, which has been disclosed by way of the above examples and discussion, addresses embodiments of the present invention encompassing the principles of the present invention. The embodiments may be changed, modified and/or implemented using various types of arrangements. Those skilled in the art will readily recognize various modifications and changes which may be made to the present invention without strictly following the exemplary embodiments and applications illustrated and described herein, and without departing from the true spirit and scope of the present invention which is set forth in the following claims.

We claim:

1. A computer implemented method of generating a customized proposal for a customer of a selling entity to facilitate a sale of a commodity offered for sale by the selling entity to the customer, the computer system including a memory arrangement and at least one processing unit, the method comprising the steps of:

storing, in the memory arrangement, a plurality of selling entity images, each of said selling entity image having a corresponding visual impression characteristic which the customer of the selling entity identifies with the selling entity;

developing a customer solution for the customer based on customer information received in the computer system, the customer information representing an interest of the customer in the commodity;

retrieving a selling entity image from the plurality of selling entity images;

generating a proposal image by integrating a customer solution specific image with the selected selling entity image to reflect a portion of the customer solution in a manner which maintains the corresponding visual impression characteristic of the selected selling entity image; and outputting the proposal image for presentation of the customer solution to the customer in a manner which reinforces the identity of the selling entity.

2. The method as recited in claim 1, further including the step of identifying a presentation output template based on the customer solution, the presentation output template defining a manner in which customer solution information is integrated with the selling entity element.

3. The method as recited in claim 2, wherein the selected selling entity element comprises an image.

4. The method of claim 3, wherein the integrating step includes the step of constructing a composite image integrating customer solution information with the image of the selected selling entity element based on the presentation output template.

5. The method of claim 4, wherein the customer solution comprises an image and the presentation output template includes image field locations and the constructing step includes insertion of each of the customer solution image and the selling entity element into one of the image field locations.

6. The method of claim 1, wherein the impression characteristic indirectly conveys the corporate image of the selling entity to the customer.

7. The method of claim 1, wherein the customer solution information comprises data and the selling entity element comprises a graph, wherein the data is used to define the size of the graph.

8. The method of claim 1, wherein the customer solution comprises text.

9. The method of claim 1, wherein the customer solution comprises a picture.

10. The method of claim 1, further including the step of identifying and retrieving a presentation output template, wherein the presentation output template defines the selling entity element.

11. A computer system for generating a customized presentation for a customer of a selling entity to facilitate a sale of a product offered for sale by the selling entity to the customer, the computer system comprising:
   a memory arrangement storing a plurality of selling entity elements, each of said selling entity elements having a corresponding impression characteristic which the customer of the selling entity identifies with the selling entity;
   a plurality of subsystems, including at least one processing unit coupled to access the memory arrangement, the plurality of subsystems including:
      a customer solution subsystem provided to develop a customer solution for the customer based on customer information received in the customer solution subsystem representing an interest of the customer in the product, and
      a presentation item generating subsystem provided to retrieve a selling entity element from the plurality of selling entity elements and to generate a presentation item by integrating, in a manner which maintains the corresponding impression characteristic of the selected selling entity element, customer solution information with the selected selling entity element to reflect a portion of the customer solution; and
   an output device provided to output a customized presentation for presentation of the customer solution in a manner which reinforces the identity of the selling entity.

12. A computer implemented method of generating a customized presentation item to facilitate a sale of a product offered for sale by the selling entity to a plurality of different types of customers, the computer system including a memory arrangement and at least one processing unit, the method comprising the steps of:
   storing one or more selling entity elements in the memory arrangement, the selling entity element being identifiable with the selling entity by customers of the selling entity;
   storing a plurality of customer type elements in the memory arrangement, the customer type elements corresponding to different types of customer for the product offered for sale by the selling entity;
   receiving customer profile information of a particular customer;
   receiving information indicative of the particular customer's interests in the product;
   generating a customer solution for the particular customer based on the customer's interest in the product;
   determining from the customer profile information a customer type of the particular customer;
   retrieving, from the plurality of customer type elements, a customer type element corresponding to the customer type of the particular customer;
   retrieving a selling entity element from the plurality of selling entity elements; and
   integrating the selected customer type element and the selected selling entity element into an integrated presentation output customized for the particular customer based on the customer solution.

13. A method as recited in claim 12, wherein the customer type corresponds to a different target market for the product and the plurality of customer type elements represent the different target markets.

14. The method as recited in claim 12, further including the step of identifying a presentation output template based on the customer solution, the presentation output template defining the manner of integration of the customer type element and the selected selling entity element.

15. The method as recited in claim 14, wherein the step of retrieving the selling entity element includes the step of retrieving a selling entity element indicated by the presentation output template.

16. The method as recited in claim 14, wherein the step of retrieving the customer type element includes the steps of:
   identifying a group of customer type elements indicated by the presentation output template, and
   retrieving a customer type element from the group of customer type elements which corresponds to the customer type of the particular customer.

17. The method of claim 14, wherein the customer type element and selling entity element each comprise an image.

18. The method of claim 17, wherein the step of integrating the selected customer type image element and the selected selling entity image element into an integrated presentation output includes the step of constructing a composite image of the selected customer type image element and the selected selling entity image element based on the presentation output template.

19. A computer system for generating a customized presentation item to facilitate a sale of a product offered for sale by the selling entity to a customer, the system comprising:
   a memory arrangement, the memory arrangement storing one or more selling entity elements selected to be identifiable by customers of the selling entity as being associated with the selling entity and a plurality of customer type elements, each customer type elements corresponding to a different target market for the product offered for sale by the selling entity; and
   a plurality of subsystems, including at least one processing unit, coupled to the memory arrangement to facilitate generation of a presentation item customized for a particular customer, the plurality of subsystems including:
      a customer information subsystem provided to receive and store within the memory arrangement customer information, the customer information including customer type information indicative of a target market associated with the particular customer and customer interest information indicative of interests of the particular customer in the product offered for sale by the selling entity, and a presentation generation subsystem provided to automatically retrieve, from the memory arrangement, a customer type element corresponding to the target market indicated by the customer information as being associated with the particular customer and a selected selling entity element, and to integrate the retrieved customer type element and the retrieved selling entity element into a presentation output customized for the particular customer based on the customer interest information.

* * * * *

UNITED STATES PATENT AND TRADEMARK OFFICE
CERTIFICATE OF CORRECTION

PATENT NO.   : 6,453,302 B1
DATED        : September 17, 2002
INVENTOR(S)  : Johnson et al.

It is certified that error appears in the above-identified patent and that said Letters Patent is hereby corrected as shown below:

Column 1,
Line 23, "On the one hand,,sellers" should read -- On the one hand, sellers --

Column 2,
Line 1, "a computer is provided" should read -- a computer system is provided --

Column 7,
Line 5, "FIGS. 19 a-o illustrate" should read -- FIGS. 19 a-p illustrate --
Line 58, "associated-with" should read -- associated with --

Column 14,
Line 9, "document of appendix C." should read -- document of FIG. 20. --

Signed and Sealed this

Fourth Day of March, 2003

JAMES E. ROGAN
*Director of the United States Patent and Trademark Office*

US006453302C1

(12) EX PARTE REEXAMINATION CERTIFICATE (8629th)

United States Patent
Johnson et al.

(10) Number: US 6,453,302 C1
(45) Certificate Issued: Oct. 18, 2011

(54) COMPUTER GENERATED PRESENTATION SYSTEM

(75) Inventors: Jerome D. Johnson, North Mankato, MN (US); Dale A. Mehr, Mankato, MN (US)

(73) Assignee: Presentation Specialist Technologies, LLC, Indian Wells, CA (US)

Reexamination Request:
No. 90/008,957, Dec. 3, 2007

Reexamination Certificate for:
Patent No.: 6,453,302
Issued: Sep. 17, 2002
Appl. No.: 08/756,122
Filed: Nov. 25, 1996

Certificate of Correction issued Mar. 4, 2003.

(51) Int. Cl.
*G06Q 30/00* (2006.01)

(52) U.S. Cl. .................................................. 705/27.2
(58) Field of Classification Search .................. None
See application file for complete search history.

(56) References Cited

U.S. PATENT DOCUMENTS

| | | | |
|---|---|---|---|
| 3,186,323 A | 6/1965 | Niehaus | |
| 3,634,669 A | 1/1972 | Soumas | |
| 3,949,159 A | 4/1976 | Ricards et al. | |
| 4,134,537 A | 1/1979 | Glaser et al. | |
| 4,149,246 A | 4/1979 | Goldman | |
| 4,190,800 A | 2/1980 | Kelly, Jr. | |
| 4,324,987 A | 4/1982 | Sullivan, II | |
| 4,359,631 A | 11/1982 | Lockwood et al. | |
| 4,435,769 A | 3/1984 | Nagano et al. | |
| 4,449,186 A | 5/1984 | Kelly et al. | |
| 4,546,434 A | 10/1985 | Gioello | |
| 4,553,206 A | 11/1985 | Smutek et al. | |
| 4,567,359 A | 1/1986 | Lockwood | |
| 4,585,904 A | 4/1986 | Mincone et al. | |
| 4,591,983 A | 5/1986 | Bennett et al. | |
| 4,677,552 A | 6/1987 | Sibley, Jr. | |
| 4,703,423 A | 10/1987 | Bado et al. | |
| 4,751,728 A | 6/1988 | Treat | |
| 4,757,267 A | 7/1988 | Riskin | |
| 4,774,655 A | 9/1988 | Kollin et al. | |
| 4,775,935 A | 10/1988 | Yourick | |
| 4,799,156 A | 1/1989 | Shavit et al. | |
| 4,825,045 A | 4/1989 | Humble | |
| 4,833,308 A | 5/1989 | Humble | |
| 4,860,123 A | 8/1989 | McCalley | |
| 4,887,208 A | 12/1989 | Schneider et al. | |

(Continued)

FOREIGN PATENT DOCUMENTS

| CA | 2121228 | 12/1989 |
|---|---|---|
| EP | 0239884 | 7/1987 |
| EP | 0302843 | 2/1989 |

(Continued)

OTHER PUBLICATIONS

Compass Startup Guide and Operator's Manual, Clear With Computers, Inc., 1991.

*Primary Examiner* — Mary Steelman

(57) ABSTRACT

A sales presentation generation system which integrates customer specific information with a selling entity element to generate a presentation item for the sale of a product customized for a particular customer of the selling entity. The customized presentation item may be constructed in a manner which reinforces the identity of the selling entity element by integrating customer solution information with a selling entity element having an impression characteristics which indirectly conveys the identity of the selling entity. A portion of the customer solution may be presented to the customer in a manner which maintains such impression characteristics of the selected selling entity element so as to convey a desired corporate "image". A presentation item generated using the system may be further, or in the alternative, customized in accordance with the type of customer to which the presentation is directed. Accordingly, the present system significantly enhances the impact of sales presentation and the likelihood of consummating a sale.

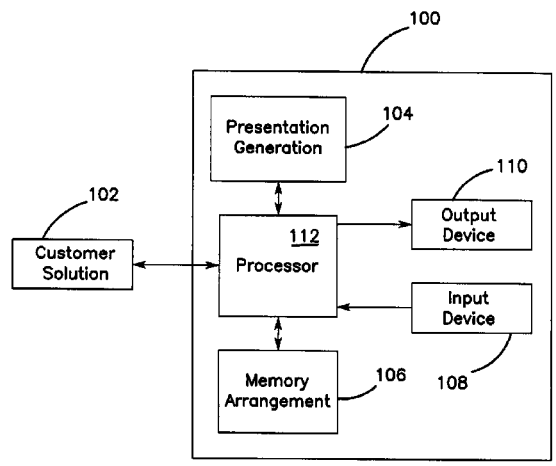

U.S. PATENT DOCUMENTS

| | | | |
|---|---|---|---|
| 4,889,292 A | 12/1989 | Loewe et al. |
| 4,905,094 A | 2/1990 | Pocock et al. |
| 4,931,929 A | 6/1990 | Sherman |
| 4,947,028 A | 8/1990 | Gorog |
| 4,964,043 A | 10/1990 | Galvin |
| 4,972,318 A | 11/1990 | Brown et al. |
| 4,974,170 A | 11/1990 | Bouve et al. |
| 4,975,841 A | 12/1990 | Kehnemuyi et al. |
| 4,982,346 A | 1/1991 | Girouard et al. |
| 4,992,940 A | 2/1991 | Dworkin |
| 4,999,806 A | 3/1991 | Chernow et al. |
| 5,014,125 A | 5/1991 | Pocock et al. |
| 5,029,099 A | 7/1991 | Goodman |
| 5,038,293 A | 8/1991 | Goodman |
| 5,040,132 A | 8/1991 | Schuricht et al. |
| 5,053,956 A | 10/1991 | Donald et al. |
| 5,056,029 A | 10/1991 | Cannon |
| 5,072,536 A | 12/1991 | Matthews et al. |
| 5,072,538 A | 12/1991 | Hendricks |
| 5,073,536 A | 12/1991 | Sheng |
| 5,077,607 A | 12/1991 | Johnson et al. |
| 5,099,422 A | 3/1992 | Foresman et al. |
| 5,146,404 A | 9/1992 | Calloway et al. |
| 5,153,825 A | 10/1992 | Yauk et al. |
| 5,191,410 A | 3/1993 | McCalley et al. |
| 5,241,464 A | 8/1993 | Greulich |
| 5,272,623 A | 12/1993 | Grubb et al. |
| 5,277,623 A | 1/1994 | Colleran |
| 5,283,829 A | 2/1994 | Anderson |
| 5,283,865 A | 2/1994 | Johnson |
| 5,309,355 A | 5/1994 | Lockwood |
| 5,310,997 A | 5/1994 | Roach et al. |
| 5,319,542 A | 6/1994 | King, Jr. et al. |
| 5,319,562 A | 6/1994 | Whitehouse |
| 5,343,386 A | 8/1994 | Barber |
| 5,367,627 A | 11/1994 | Johnson |
| 5,381,477 A | 1/1995 | Beyers, II |
| 5,383,111 A | 1/1995 | Homma |
| 5,388,211 A | 2/1995 | Hornbuckle |
| 5,392,220 A | 2/1995 | van den Hamer |
| 5,396,417 A | 3/1995 | Burks |
| 5,396,546 A | 3/1995 | Remillard |
| 5,418,713 A | 5/1995 | Allen |
| 5,430,644 A | 7/1995 | Deaton |
| 5,432,904 A | 7/1995 | Wong |
| 5,442,771 A | 8/1995 | Filepp |
| 5,455,599 A | 10/1995 | Cabral |
| 5,459,306 A | 10/1995 | Stein |
| 5,461,667 A | 10/1995 | Remillard |
| 5,481,542 A | 1/1996 | Longston |
| 5,493,490 A | 2/1996 | Johnson |
| 5,497,479 A | 3/1996 | Hornbuckle |
| 5,504,674 A | 4/1996 | Chen |
| 5,504,675 A | 4/1996 | Cragun |
| 5,507,746 A | 4/1996 | Lin |
| 5,515,270 A | 5/1996 | Weinblatt |
| 5,528,490 A | 6/1996 | Hill |
| 5,544,320 A | 8/1996 | Konrad |
| 5,551,021 A | 8/1996 | Harada |
| 5,557,722 A | 9/1996 | DeRose |
| 5,576,951 A | 11/1996 | Lockwood |
| 5,581,270 A | 12/1996 | Smith |
| 5,583,763 A | 12/1996 | Atcheson |
| 5,608,838 A | 3/1997 | Brookley |
| 5,615,342 A | 3/1997 | Johnson |
| 5,619,639 A | 4/1997 | Mast |
| 5,625,776 A | 4/1997 | Johnson |
| 5,626,776 A | 5/1997 | Morris, Jr. |
| 5,642,484 A | 6/1997 | Harrison, III |
| 5,648,768 A | 7/1997 | Bouve |
| 5,675,752 A | 10/1997 | Scott |
| 5,682,525 A | 10/1997 | Bouve |
| 5,692,206 A | 11/1997 | Shirley |
| 5,694,546 A | 12/1997 | Reisman |
| 5,696,901 A | 12/1997 | Konrad |
| 5,708,806 A | 1/1998 | DeRose |
| 5,710,886 A | 1/1998 | Christensen |
| 5,710,887 A | 1/1998 | Chelliah |
| 5,715,515 A | 2/1998 | Akins, III |
| 5,717,597 A | 2/1998 | Kara |
| 5,724,424 A | 3/1998 | Gifford |
| 5,724,525 A | 3/1998 | Beyers, III |
| 5,740,425 A | 4/1998 | Povilus |
| 5,740,549 A | 4/1998 | Reilly |
| 5,754,940 A | 5/1998 | Smith |
| 5,758,331 A | 5/1998 | Johnson |
| 5,761,648 A | 6/1998 | Golden |
| 5,761,662 A | 6/1998 | Dasan |
| 5,771,354 A | 6/1998 | Crawford |
| 5,774,670 A | 6/1998 | Montulli |
| 5,774,870 A | 6/1998 | Storey |
| 5,778,367 A | 7/1998 | Wesinger, Jr. |
| 5,793,414 A | 8/1998 | Shaffer |
| 5,819,240 A | 10/1998 | Kara |
| 5,839,112 A | 11/1998 | Schreitmueller |
| 5,845,077 A | 12/1998 | Fawcett |
| 5,845,263 A | 12/1998 | Camaisa |
| 5,845,265 A | 12/1998 | Woolston |
| 5,854,263 A | 12/1998 | Glamkowski |
| 5,860,073 A | 1/1999 | Ferrel |
| 5,862,223 A | 1/1999 | Walker |
| 5,901,287 A | 5/1999 | Bull |
| 5,907,837 A | 5/1999 | Ferrel |
| 5,933,811 A | 8/1999 | Angles |
| 5,935,004 A | 8/1999 | Tarr |
| 5,970,471 A | 10/1999 | Hill |
| 5,974,444 A | 10/1999 | Konrad |
| 5,987,434 A | 11/1999 | Libman |
| 5,987,480 A | 11/1999 | Donohue |
| 5,991,739 A | 11/1999 | Cupps |
| 6,014,638 A | 1/2000 | Burge |
| 6,014,651 A | 1/2000 | Crawford |
| 6,052,514 A | 4/2000 | Gill |
| 6,064,397 A | 5/2000 | Herregods |
| 6,067,525 A | 5/2000 | Johnson |
| 6,073,214 A | 6/2000 | Fawcett |
| 6,169,979 B1 | 1/2001 | Johnson |
| 6,178,362 B1 | 1/2001 | Woolard |
| 6,185,540 B1 | 2/2001 | Schreitmueller |
| 6,199,082 B1 | 3/2001 | Ferrel |
| 6,238,290 B1 | 5/2001 | Tarr |
| 6,278,996 B1 | 8/2001 | Richardson |
| 6,295,530 B1 | 9/2001 | Ritchie |
| 6,321,208 B1 | 11/2001 | Barnett |
| 6,323,894 B1 | 11/2001 | Katz |
| 6,327,599 B1 | 12/2001 | Warmus |
| 6,327,617 B1 | 12/2001 | Fawcett |
| 6,411,947 B1 | 6/2002 | Rice |
| 6,438,547 B1 | 8/2002 | Mehr et al. |
| 6,636,893 B1 | 10/2003 | Fong |
| 6,889,194 B1 | 5/2005 | Kadaba |
| 7,072,849 B1 | 7/2006 | Filepp |
| 2002/0010598 A1 | 1/2002 | Johnson |
| 2005/0240451 A1 | 10/2005 | Johnson |

FOREIGN PATENT DOCUMENTS

| | | |
|---|---|---|
| EP | 0344976 | 4/1996 |
| GB | 2105075 | 3/1983 |
| GB | 2177245 | 1/1987 |
| GB | 2201017 | 8/1988 |

| GB | 2224380 | 5/1990 | WO | WO 96/06403 | 2/1996 |
| GB | 2243970 | 11/1991 | WO | WO 96/07146 | 3/1996 |
| WO | WO 85/03152 | 7/1985 | WO | WO 97/20279 | 6/1997 |
| WO | WO 90/11587 | 10/1990 | WO | WO 97/22066 | 6/1997 |
| WO | WO 93/22739 | 11/1993 | WO | WO 97/26610 | 7/1997 |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-19 are cancelled.

* * * * *